(12) United States Patent
Llorca et al.

(10) Patent No.: US 10,785,127 B1
(45) Date of Patent: Sep. 22, 2020

(54) SUPPORTING SERVICES IN DISTRIBUTED NETWORKS

(71) Applicant: Nokia Solutions and Networks Oy, Espoo (FI)

(72) Inventors: Jaime Llorca, Jersey City, NJ (US); Antonia Tulino, Red Bank, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/376,120

(22) Filed: Apr. 5, 2019

(51) Int. Cl.
G06F 15/173 (2006.01)
H04L 12/24 (2006.01)
H04L 29/08 (2006.01)
H04L 29/06 (2006.01)

(52) U.S. Cl.
CPC ...... H04L 41/5041 (2013.01); H04L 41/0806 (2013.01); H04L 41/12 (2013.01); H04L 65/608 (2013.01); H04L 67/16 (2013.01)

(58) Field of Classification Search
CPC . H04L 41/5041; H04L 41/0806; H04L 41/12; H04L 65/608; H04L 67/16
USPC ........................................................ 709/223
See application file for complete search history.

(56) References Cited

U.S. PATENT DOCUMENTS

| 6,047,323 A * | 4/2000 | Krause | G06F 9/54 |
| | | | 709/227 |
| 2003/0023709 A1 * | 1/2003 | Alvarez | H04J 14/0291 |
| | | | 709/223 |
| 2003/0033519 A1 * | 2/2003 | Buckman | H04L 67/2823 |
| | | | 713/153 |
| 2015/0199214 A1 | 7/2015 | Lee et al. | |
| 2015/0256387 A1 | 9/2015 | Sum et al. | |
| 2015/0256439 A1 | 9/2015 | Bragstad et al. | |

(Continued)

FOREIGN PATENT DOCUMENTS

| CN | 105574205 A | 5/2016 |
| EP | 3 367 240 A1 | 5/2018 |

OTHER PUBLICATIONS

Cohen, R., et al., "Near Optimal Placement of Virtual Network Functions," 2015 IEEE Conference on Computer Communications (INFOCOM), Hong Kong, Apr. 26, 2015, 9 pages.

(Continued)

Primary Examiner — Atta Khan
(74) Attorney, Agent, or Firm — Tong, Rea, Bentley & Kim, LLC

(57) ABSTRACT

Various example embodiments for supporting services within a distributed cloud network are configured to support capabilities for solving a cloud service distribution problem for a set of services to be deployed within a distributed cloud network in order to determine the placement of service functions of the services within the cloud network, the routing of service flows of the services through the appropriate service functions of the services within the cloud network, and the associated allocation of cloud and network resources that support the deployment and routing of the services within the cloud network. Various example embodiments for supporting services within a distributed cloud network are configured to support capabilities for solving a cloud service distribution problem for a set of services to be deployed within a distributed cloud network in a manner for reducing or even minimizing the overall cloud network cost in the distributed cloud network.

22 Claims, 9 Drawing Sheets

(56) References Cited

U.S. PATENT DOCUMENTS

2016/0105489 A1    4/2016   Llorca et al.
2018/0316620 A1   11/2018   Llorca et al.

OTHER PUBLICATIONS

Sang, Y., et al., "Provably Efficient Algorithms for Joint Placement and Allocation of Virtual Network Functions," 2017 IEEE Conference on Computer Communications, Atlanta, GA, May 1, 2017, 12 pages.

Bari, M. F., et al., "On Orchestrating Virtual Network Functions in NFV," 2015 $11^{th}$ International Conference on Network and Service Management (CNSM), Barcelona, Spain, Jan. 4, 2016, 14 pages.

Luizelli, M. C., et al., "Piecing Together the NFV Provisioning Puzzle: Efficient Placement and Chaining of Virtual Network Functions," 2015 IFIP/IEEE International Symposium on Integrated Network Management (IM), Ottawa, CA, May 11, 2015, 10 pages.

Ghaznavi, M., et al., "Distributed Service Function Chaining," IEEE Journal on Selected Areas in Communications, Vo., 35., Issue 11, Nov. 2017, 11 pages.

Steiner, M., et al., "Network-Aware Service Placement in a Distributed Cloud Environment," SIGCOMM '12, Helsinki, Finland, Aug. 13-17, 2012, pp. 73-74.

Xhagjika, Vamis, "Resource, Data and Application Management for Cloud Federations and Multi-Clouds," Doctoral Thesis in Distributed Computing (Universitat Politecnica de Catalunya, Barcelona, Spain) and Doctoral Thesis in Information and Communication Technology (KTH Royal Institute of Technology, Stockholm, Sweden), 2017, 141 pages.

\* cited by examiner

FIG. 5A
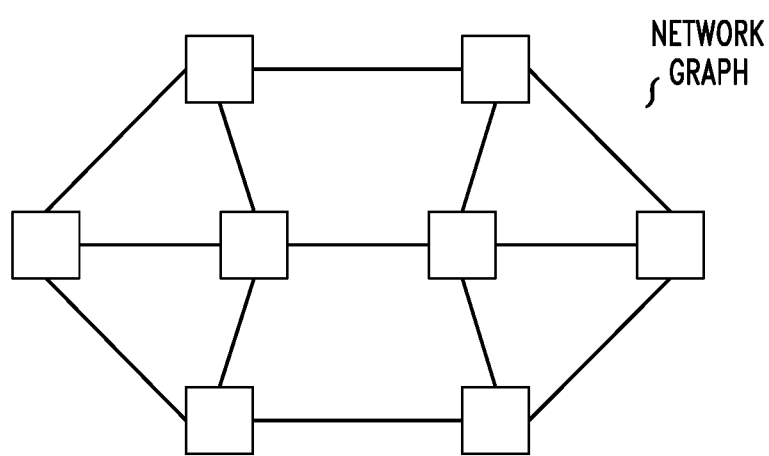
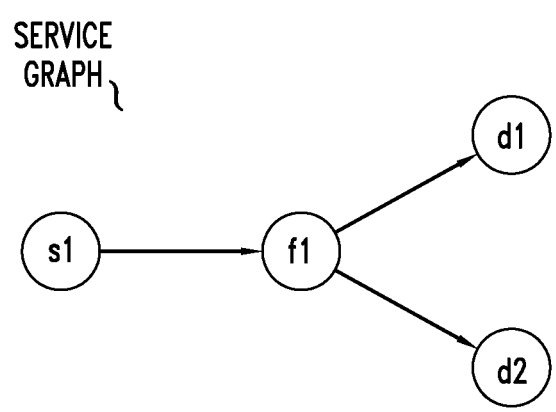

FIG. 6

Algorithm 1: Disjoint decomposition step of d-UMCF

Input: Set of service descriptions $\Phi = \{\varnothing\}$, and LP solution $\{f_{uv}^{(d,o)}, f_{uv}^{o}\}$ 1: Compute destination and function instance sets for all $o \equiv (i, j) \in \mathcal{E}^{\Phi}$:

$D(o) = \{d \in Q^{\Phi} | \text{exists a path in } G^{\Phi} \text{ connecting } j \text{ to } d\}$ $U(i) = \{u \in V | f_{pu}^{(d,o)} > 0, o \in Y(i)\}$ $U(j) = \{u \in V | f_{pu}^{(d,o)} > 0, o \in Y(j)\}$ 2:   for each $\varnothing \in \Phi$ do
3:     $D_\varnothing \leftarrow \emptyset$, $x_\varnothing \leftarrow 1$, $k \leftarrow 1$
4:     while $x_\varnothing > 0$ do
5:       $M = (M^V, M^E) \leftarrow (\emptyset, \emptyset)$
6:       $W \leftarrow \emptyset$
7:       $Q \leftarrow S(\varnothing)$
8:       for each $i \in S(\varnothing)$, set $M^V(i) \leftarrow U(i)$
9:       while $|Q| > 0$ do
10:         pick a node $i \in Q$ and set $Q \leftarrow Q \setminus \{i\}$
11:         for each $o \equiv (i, j) \in Y(i) \subset \mathcal{E}^{\varnothing}$ do
12:           update $M^E(i, j)$ and $M^V$ according to Procedure 1
13:           $Q \leftarrow Q \cup \{j\}$
14:         end for
15:       end while
16:       $W \leftarrow \{x_\varnothing\} \cup \{f_{uv}^{(d,o)} | (u,v) \in M, o \in \mathcal{E}^{\varnothing}, d \in Q^{\Phi}\}$
17:       $p \leftarrow \min W$
18:       $w \leftarrow w - p, \forall w \in W$
19:       $f_{uv}^{o} = \max_d f_{uv}^{(d,o)}, \forall (u,v) \in \mathcal{E}^a, o \in \mathcal{E}^{\varnothing}$
20:       $D_\varnothing \leftarrow D_\varnothing \cup (M, p)$ and set $k \leftarrow k+1$
21:     end while
22:   end for Output: Set of service decompositions $D_\Phi = \{D_\varnothing\}$

FIG. 7

Algorithm 2: Joint decomposition step of j-UMCF
Input: Set of service descriptions $\Phi = \{\varnothing\}$, and LP solution $\{f_{uv}^{(d,o)}, f_{uv}^{o}\}$ 1: Compute destination and function instance sets for all $o \equiv (i, j) \in \mathcal{E}^\Phi$:

$D(o) = \{d \in Q^\Phi \mid \text{exists a path in } G^\Phi \text{ connecting } j \text{ to } d\}$ $U(i) = \{u \in V \mid f_{pu}^{(d,o)} > 0, o \in Y(i)\}$ $U(j) = \{u \in V \mid f_{pu}^{(d,o)} > 0, o \in Y(j)\}$ 2:   $D_\Phi \leftarrow \varnothing$, $x_\Phi \leftarrow 1$
3:   while $x_\Phi > 0$ do
4:     $M = (M^V, M^E) \leftarrow (\varnothing, \varnothing)$
5:     $W \leftarrow \varnothing$
6:     for each $\varnothing \in \Phi$ do
7:       $Q \leftarrow S(\varnothing)$
8:       for each $i \in S(\varnothing)$, set $M^V(i) \leftarrow U(i)$
9:       while $|Q| > 0$ do
10:         pick a node $i \in Q$ and set $Q \leftarrow Q \setminus \{i\}$
11:         for each $o \equiv (i, j) \in \mathcal{E}^\varnothing$ do
12:           update $M^E(i, j)$ $M^V(j)$ according to Procedure 2
13:           $Q \leftarrow Q \cup \{j\}$
14:       end for
15:       end while
16:       $t_{uv}^{o} \leftarrow 1, \forall (u,v) \in M, o \in \mathcal{E}^\varnothing$
17:       $t_{uv}^{oc} \leftarrow \max_{o \in C(oc)} t_{uv}^{o}, \forall (u,v) \in \mathcal{E}^a, oc \in O$
18:       $C_{uv} \leftarrow C_{uv} - \Sigma_{oc \in O} t_{uv}^{oc} \lambda_{uv}^{oc}, \forall (u,v) \in \mathcal{E}^a$
19:     end for
20:     $W \leftarrow \{x_\Phi\} \cup \{f_{uv}^{(d,o)} \mid (u,v) \in M, o \in \mathcal{E}^\varnothing, d \in Q^\Phi\}$
21:     $p \leftarrow \min W$
22:     $w \leftarrow w - p, \forall w \in W$
23:     $f_{uv}^{o} = \max_d f_{uv}^{(d,o)}, \forall (u,v) \in \mathcal{E}^a, o \in \mathcal{E}^\Phi$
24:     $D_\Phi \leftarrow D_\Phi \cup (M, p)$ and set $k \leftarrow k+1$
25: end while Output: Decomposition of entire set of services $D_\Phi$

SUPPORTING SERVICES IN DISTRIBUTED NETWORKS

TECHNICAL FIELD

Various example embodiments relate generally to communication systems and, more particularly but not exclusively, supporting real-time stream-processing services in distributed cloud networks.

BACKGROUND

Distributed cloud networking builds on function virtualization techniques and software defined networking to enable deployment of services in the form virtualized service functions that are instantiated over general purpose servers at distributed cloud locations interconnected by a programmable network fabric.

SUMMARY

In at least some example embodiments, an apparatus includes at least one processor and at least one memory including computer program code, wherein the at least one memory and the computer program code are configured to, with the at least one processor, cause the apparatus to at least receive, for a set of services, service description information including, for each of the services, a respective service description indicative of a set of service elements including one or more service functions and one or more service streams, receive, for a network including a set of network nodes and a set of network links, network description information indicative of a network graph for the network, determine, for the set of services based on the service description information and the network description information, a network deployment solution indicative of a mapping of the set of services to the network while permitting multiple instances of one or more of the service elements of one or more of the services, determine, for each of the services based on a decomposition of the network deployment solution, a respective embedding of the service within the network, and initiate, based on the respective embeddings of the respective services within the network, instantiation of the services within the network. In at least some example embodiments, the network deployment solution is a linear programming (LP) relaxation of an integer linear problem (ILP) defined based on the service description information and the network description information. In at least some example embodiments, for a given service element of a given one of the services, the network deployment solution includes multiple instances of the given service element. In at least some example embodiments, the multiple instances of the given service element are associated with multiple service endpoints of the given one of the services. In at least some example embodiments, the multiple service endpoints of the given one of the services include multiple service sources of the given one of the services or multiple service destinations of the given one of the services. In at least some example embodiments, the multiple instances of the given service element are associated with multiple copies of a service stream of the given one of the services that are associated with multiple network paths of the network. In at least some example embodiments, the network deployment solution includes, for at least one of the services, a respective set of potential embeddings of the respective service within the network. In at least some example embodiments, for at least one of the services, the respective set of potential embeddings includes a set of multiple fractional potential embeddings for one of the service elements of the respective service. In at least some example embodiments, for at least one of the services, the network deployment solution includes multiple instances of a given service element of the respective service and the respective set of potential embeddings includes a set of multiple fractional potential embeddings for one of the multiple instances of the given service element. In at least some example embodiments, the respective embeddings of the services within the network are determined based on respective sets of potential embeddings of the respective services within the network. In at least some example embodiments, for at least one of the services, the respective set of potential embeddings of the respective service within the network is determined based on mapping of the respective one or more service streams of the respective service to a respective set of paths of the network graph. In at least some example embodiments, the set of paths of the network graph includes multiple paths associated with multiple instances of one of the service streams of the respective service. In at least some example embodiments, the decomposition of the network deployment solution is a disjoint decomposition of the network deployment solution for the respective services individually. In at least some example embodiments, to determine the respective embeddings of the services within the network, the at least one memory and the program code are configured to, with the at least one processor, cause the apparatus to at least identify, for each of the services based on the decomposition of the network deployment solution, a respective set of potential embeddings of the respective service within the network and select, for each of the services from the respective set of potential embeddings of the respective service within the network, the respective embedding of the respective service within the network. In at least some example embodiments, the at least one memory and the program code are configured to, with the at least one processor, cause the apparatus to at least determine, for each of the potential embeddings based on an amount of service traffic of the respective service determined to be associated with the respective potential embedding, a respective probability that the respective potential embedding is selected for the respective service. In at least some example embodiments, to determine the respective embeddings of the services within the network, the at least one memory and the program code are configured to, with the at least one processor, cause the apparatus to at least determine, for one of the service streams of one of the services, a set of paths of the network graph. In at least some example embodiments, to determine the set of paths of the network graph for the one of the service streams of the one of the services, the at least one memory and the program code are configured to, with the at least one processor, cause the apparatus to at least select, from the network graph, a selected path satisfying a maximum number of service destinations of the one of the services. In at least some example embodiments, the decomposition of the network deployment solution is a joint decomposition of the network deployment solution for the services as a group. In at least some example embodiments, to determine the respective embeddings of the services within the network, the at least one memory and the program code are configured to, with the at least one processor, cause the apparatus to at least determine, for the set of services based on the decomposition of the network deployment solution, a plurality of sets of potential embeddings of the respective services within the network and select, from the plurality of sets of potential embeddings of the respective services within the network, one of the plurality of sets of potential embeddings to provide thereby the respective embeddings of the respective services within the network. In at least some example embodiments, the at least one memory and the program code are configured to, with the at least one processor, cause the apparatus to at least determine, for each of the sets of potential embeddings based on an amount of service traffic of the services determined to be associated with the respective set of potential embeddings, a respective probability that the respective set of potential embeddings is selected for the set of services.

In at least some example embodiments, a non-transitory computer-readable medium includes instructions configured to cause an apparatus to at least receive, for a set of services, service description information including, for each of the services, a respective service description indicative of a set of service elements including one or more service functions and one or more service streams, receive, for a network including a set of network nodes and a set of network links, network description information indicative of a network graph for the network, determine, for the set of services based on the service description information and the network description information, a network deployment solution indicative of a mapping of the set of services to the network while permitting multiple instances of one or more of the service elements of one or more of the services, determine, for each of the services based on a decomposition of the network deployment solution, a respective embedding of the service within the network, and initiate, based on the respective embeddings of the respective services within the network, instantiation of the services within the network. In at least some example embodiments, the network deployment solution is a linear programming (LP) relaxation of an integer linear problem (ILP) defined based on the service description information and the network description information. In at least some example embodiments, for a given service element of a given one of the services, the network deployment solution includes multiple instances of the given service element. In at least some example embodiments, the multiple instances of the given service element are associated with multiple service endpoints of the given one of the services. In at least some example embodiments, the multiple service endpoints of the given one of the services include multiple service sources of the given one of the services or multiple service destinations of the given one of the services. In at least some example embodiments, the multiple instances of the given service element are associated with multiple copies of a service stream of the given one of the services that are associated with multiple network paths of the network. In at least some example embodiments, the network deployment solution includes, for at least one of the services, a respective set of potential embeddings of the respective service within the network. In at least some example embodiments, for at least one of the services, the respective set of potential embeddings includes a set of multiple fractional potential embeddings for one of the service elements of the respective service. In at least some example embodiments, for at least one of the services, the network deployment solution includes multiple instances of a given service element of the respective service and the respective set of potential embeddings includes a set of multiple fractional potential embeddings for one of the multiple instances of the given service element. In at least some example embodiments, the respective embeddings of the services within the network are determined based on respective sets of potential embeddings of the respective services within the network. In at least some example embodiments, for at least one of the services, the respective set of potential embeddings of the respective service within the network is determined based on mapping of the respective one or more service streams of the respective service to a respective set of paths of the network graph. In at least some example embodiments, the set of paths of the network graph includes multiple paths associated with multiple instances of one of the service streams of the respective service. In at least some example embodiments, the decomposition of the network deployment solution is a disjoint decomposition of the network deployment solution for the respective services individually. In at least some example embodiments, to determine the respective embeddings of the services within the network, the non-transitory computer-readable medium includes instructions configured to cause the apparatus to at least identify, for each of the services based on the decomposition of the network deployment solution, a respective set of potential embeddings of the respective service within the network and select, for each of the services from the respective set of potential embeddings of the respective service within the network, the respective embedding of the respective service within the network. In at least some example embodiments, the non-transitory computer-readable medium includes instructions configured to cause the apparatus to at least determine, for each of the potential embeddings based on an amount of service traffic of the respective service determined to be associated with the respective potential embedding, a respective probability that the respective potential embedding is selected for the respective service. In at least some example embodiments, to determine the respective embeddings of the services within the network, the non-transitory computer-readable medium includes instructions configured to cause the apparatus to at least determine, for one of the service streams of one of the services, a set of paths of the network graph. In at least some example embodiments, to determine the set of paths of the network graph for the one of the service streams of the one of the services, the non-transitory computer-readable medium includes instructions configured to cause the apparatus to at least select, from the network graph, a selected path satisfying a maximum number of service destinations of the one of the services. In at least some example embodiments, the decomposition of the network deployment solution is a joint decomposition of the network deployment solution for the services as a group. In at least some example embodiments, to determine the respective embeddings of the services within the network, the non-transitory computer-readable medium includes instructions configured to cause the apparatus to at least determine, for the set of services based on the decomposition of the network deployment solution, a plurality of sets of potential embeddings of the respective services within the network and select, from the plurality of sets of potential embeddings of the respective services within the network, one of the plurality of sets of potential embeddings to provide thereby the respective embeddings of the respective services within the network. In at least some example embodiments, the at least one memory and the program code are configured to, with the at least one processor, cause the apparatus to at least determine, for each of the sets of potential embeddings based on an amount of service traffic of the services determined to be associated with the respective set of potential embeddings, a respective probability that the respective set of potential embeddings is selected for the set of services.

In at least some example embodiments, a method includes receiving, for a set of services, service description information including, for each of the services, a respective service description indicative of a set of service elements including one or more service functions and one or more service streams, receiving, for a network including a set of network nodes and a set of network links, network description information indicative of a network graph for the network, determining, for the set of services based on the service description information and the network description information, a network deployment solution indicative of a mapping of the set of services to the network while permitting multiple instances of one or more of the service elements of one or more of the services, determining, for each of the services based on a decomposition of the network deployment solution, a respective embedding of the service within the network, and initiating, based on the respective embeddings of the respective services within the network, instantiation of the services within the network. In at least some example embodiments, the network deployment solution is a linear programming (LP) relaxation of an integer linear problem (ILP) defined based on the service description information and the network description information. In at least some example embodiments, for a given service element of a given one of the services, the network deployment solution includes multiple instances of the given service element. In at least some example embodiments, the multiple instances of the given service element are associated with multiple service endpoints of the given one of the services. In at least some example embodiments, the multiple service endpoints of the given one of the services include multiple service sources of the given one of the services or multiple service destinations of the given one of the services. In at least some example embodiments, the multiple instances of the given service element are associated with multiple copies of a service stream of the given one of the services that are associated with multiple network paths of the network. In at least some example embodiments, the network deployment solution includes, for at least one of the services, a respective set of potential embeddings of the respective service within the network. In at least some example embodiments, for at least one of the services, the respective set of potential embeddings includes a set of multiple fractional potential embeddings for one of the service elements of the respective service. In at least some example embodiments, for at least one of the services, the network deployment solution includes multiple instances of a given service element of the respective service and the respective set of potential embeddings includes a set of multiple fractional potential embeddings for one of the multiple instances of the given service element. In at least some example embodiments, the respective embeddings of the services within the network are determined based on respective sets of potential embeddings of the respective services within the network. In at least some example embodiments, for at least one of the services, the respective set of potential embeddings of the respective service within the network is determined based on mapping of the respective one or more service streams of the respective service to a respective set of paths of the network graph. In at least some example embodiments, the set of paths of the network graph includes multiple paths associated with multiple instances of one of the service streams of the respective service. In at least some example embodiments, the decomposition of the network deployment solution is a disjoint decomposition of the network deployment solution for the respective services individually. In at least some example embodiments, determining the respective embeddings of the services within the network includes identifying, for each of the services based on the decomposition of the network deployment solution, a respective set of potential embeddings of the respective service within the network and selecting, for each of the services from the respective set of potential embeddings of the respective service within the network, the respective embedding of the respective service within the network. In at least some example embodiments, the method includes determining, for each of the potential embeddings based on an amount of service traffic of the respective service determined to be associated with the respective potential embedding, a respective probability that the respective potential embedding is selected for the respective service. In at least some example embodiments, determining the respective embeddings of the services within the network includes determining, for one of the service streams of one of the services, a set of paths of the network graph. In at least some example embodiments, determining the set of paths of the network graph for the one of the service streams of the one of the services includes selecting, from the network graph, a selected path satisfying a maximum number of service destinations of the one of the services. In at least some example embodiments, the decomposition of the network deployment solution is a joint decomposition of the network deployment solution for the services as a group. In at least some example embodiments, determining the respective embeddings of the services within the network includes determining, for the set of services based on the decomposition of the network deployment solution, a plurality of sets of potential embeddings of the respective services within the network and selecting, from the plurality of sets of potential embeddings of the respective services within the network, one of the plurality of sets of potential embeddings to provide thereby the respective embeddings of the respective services within the network. In at least some example embodiments, the method includes determining, for each of the sets of potential embeddings based on an amount of service traffic of the services determined to be associated with the respective set of potential embeddings, a respective probability that the respective set of potential embeddings is selected for the set of services.

In at least some example embodiments, an apparatus includes means for receiving, for a set of services, service description information including, for each of the services, a respective service description indicative of a set of service elements including one or more service functions and one or more service streams, means for receiving, for a network including a set of network nodes and a set of network links, network description information indicative of a network graph for the network, means for determining, for the set of services based on the service description information and the network description information, a network deployment solution indicative of a mapping of the set of services to the network while permitting multiple instances of one or more of the service elements of one or more of the services, means for determining, for each of the services based on a decomposition of the network deployment solution, a respective embedding of the service within the network, and means for initiating, based on the respective embeddings of the respective services within the network, instantiation of the services within the network. In at least some example embodiments, the network deployment solution is a linear programming (LP) relaxation of an integer linear problem (ILP) defined based on the service description information and the network description information. In at least some example embodiments, for a given service element of a given one of the services, the network deployment solution includes multiple instances of the given service element. In at least some example embodiments, the multiple instances of the given service element are associated with multiple service endpoints of the given one of the services. In at least some example embodiments, the multiple service endpoints of the given one of the services include multiple service sources of the given one of the services or multiple service destinations of the given one of the services. In at least some example embodiments, the multiple instances of the given service element are associated with multiple copies of a service stream of the given one of the services that are associated with multiple network paths of the network. In at least some example embodiments, the network deployment solution includes, for at least one of the services, a respective set of potential embeddings of the respective service within the network. In at least some example embodiments, for at least one of the services, the respective set of potential embeddings includes a set of multiple fractional potential embeddings for one of the service elements of the respective service. In at least some example embodiments, for at least one of the services, the network deployment solution includes multiple instances of a given service element of the respective service and the respective set of potential embeddings includes a set of multiple fractional potential embeddings for one of the multiple instances of the given service element. In at least some example embodiments, the respective embeddings of the services within the network are determined based on respective sets of potential embeddings of the respective services within the network. In at least some example embodiments, for at least one of the services, the respective set of potential embeddings of the respective service within the network is determined based on mapping of the respective one or more service streams of the respective service to a respective set of paths of the network graph. In at least some example embodiments, the set of paths of the network graph includes multiple paths associated with multiple instances of one of the service streams of the respective service. In at least some example embodiments, the decomposition of the network deployment solution is a disjoint decomposition of the network deployment solution for the respective services individually. In at least some example embodiments, the means for determining the respective embeddings of the services within the network includes means for identifying, for each of the services based on the decomposition of the network deployment solution, a respective set of potential embeddings of the respective service within the network and means for selecting, for each of the services from the respective set of potential embeddings of the respective service within the network, the respective embedding of the respective service within the network. In at least some example embodiments, the apparatus includes means for determining, for each of the potential embeddings based on an amount of service traffic of the respective service determined to be associated with the respective potential embedding, a respective probability that the respective potential embedding is selected for the respective service. In at least some example embodiments, the means for determining the respective embeddings of the services within the network includes means for determining, for one of the service streams of one of the services, a set of paths of the network graph. In at least some example embodiments, the means for determining the set of paths of the network graph for the one of the service streams of the one of the services includes means for selecting, from the network graph, a selected path satisfying a maximum number of service destinations of the one of the services. In at least some example embodiments, the decomposition of the network deployment solution is a joint decomposition of the network deployment solution for the services as a group. In at least some example embodiments, the means for determining the respective embeddings of the services within the network includes means for determining, for the set of services based on the decomposition of the network deployment solution, a plurality of sets of potential embeddings of the respective services within the network and means for selecting, from the plurality of sets of potential embeddings of the respective services within the network, one of the plurality of sets of potential embeddings to provide thereby the respective embeddings of the respective services within the network. In at least some example embodiments, the apparatus includes means for determining, for each of the sets of potential embeddings based on an amount of service traffic of the services determined to be associated with the respective set of potential embeddings, a respective probability that the respective set of potential embeddings is selected for the set of services.

BRIEF DESCRIPTION OF THE DRAWINGS

The teachings herein can be readily understood by considering the following detailed description in conjunction with the accompanying drawings, in which:

FIGS. 5A-5D depict example embodiments of a cloud network graph for a cloud network and a service graph for a service for illustrating non-isomorphism between the service graph and instantiation of the service graph in the cloud network;

FIG. 6 depicts an example embodiment of an algorithm configured for disjoint decomposition of a linear programming solution of a service distribution problem into service embeddings for services in a set of services;

FIG. 7 depicts an example embodiment of an algorithm configured for joint decomposition of a linear programming solution of a service distribution problem into service embeddings for services in a set of services;

To facilitate understanding, identical reference numerals have been used, where possible, to designate identical elements that are common to the figures.

DETAILED DESCRIPTION

Figure 1:
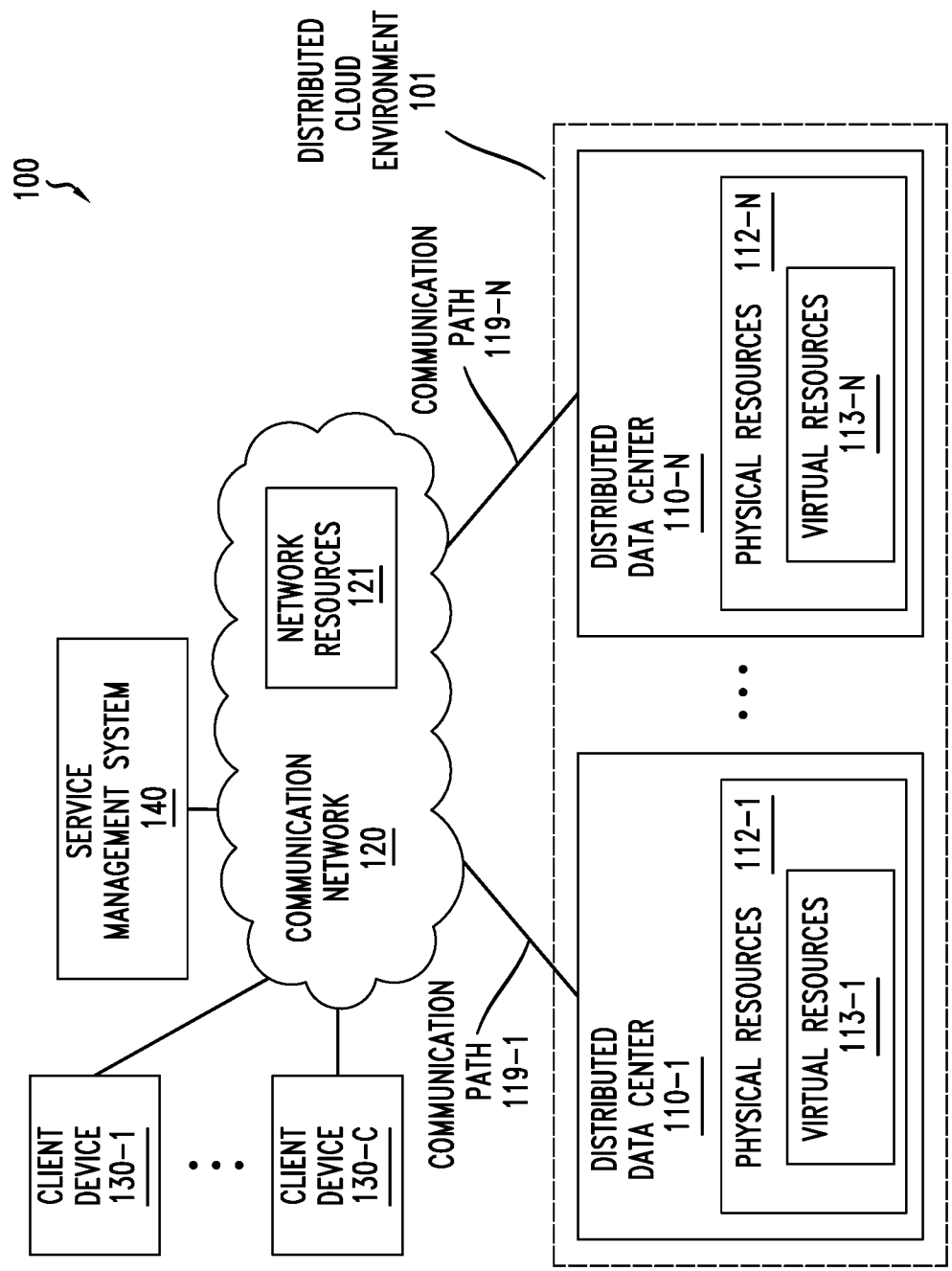
FIG. 1 depicts an example embodiment of a distributed cloud system configured to support a set of services.

Various example embodiments for supporting services within a distributed cloud network are presented. Various example embodiments for supporting services within a distributed cloud network may be further understood based on use of the following list of acronyms:

- 5G—Fifth Generation
- CDMA—Code Divisional Multiple Access
- GSM—Global System for Mobile (GSM)
- ILP—integer linear problem
- IoT—Internet-of-Things
- LAN—local area network
- LP—linear programming
- LTE—Long Term Evolution
- MAN—metropolitan area network
- MTC—machine type communication
- NFV—network function virtualization
- RTSP—real-time stream-processing
- SDN—software defined networking
- UMCF—unsplittable multicast cloud-network flow
- VM—virtual machine
- VC—virtual container
- VNF—virtual network function
- WAN—wide area network
- WLAN—wireless local area network Various example embodiments for supporting services within a distributed cloud network are configured to support capabilities for solving a cloud service distribution problem for a set of services to be deployed within a distributed cloud network in order to determine the placement of service functions of the services within the cloud network, the routing of service flows of the services through the appropriate service functions of the services within the cloud network, and the associated allocation of cloud and network resources that support the deployment and routing of the services within the cloud network. Various example embodiments for supporting services within a distributed cloud network are configured to support capabilities for solving a cloud service distribution problem for a set of services to be deployed within a distributed cloud network in a manner for reducing or even minimizing the overall cloud network cost in the distributed cloud network.

Various example embodiments for supporting services within a distributed cloud network are configured to support stream-processing services in a distributed cloud network. The stream-processing services may be real-time stream-processing (RTSP) services, such as network services (e.g., distributed cloud networking within a distributed cloud network, which may build on network function virtualization (NFV) and software defined networking (SDN) to enable the deployment of network services in the form of elastic virtual network functions (VNFs) that are instantiated over general purpose servers at distributed cloud locations and that are interconnected by a programmable network fabric), real-time analytics services, virtual reality services, augmented reality services, industrial automation services, and so forth.

Various example embodiments for supporting RTSP services within a distributed cloud network may be configured to support provisioning and use of RTSP services in a distributed cloud network. Various example embodiments for supporting RTSP services within a distributed cloud network may be configured to support placement of the RTSP services in the distributed cloud network (e.g., determining placement of stream processing operators of the RTSP services within the distributed cloud network, determining cloud and network resources for use in supporting the stream processing operators of the RTSP services within the distributed cloud network, configuring elements of the distributed cloud network to support the stream processing operators of the RTSP services, and so forth). Various example embodiments for supporting provisioning of RTSP services in a distributed cloud network may be configured to support use of RTSP services in a distributed cloud network (e.g., determining the routing of streams through the appropriate sequences of stream processing operators of the RTSP services, operating the stream processing operators of the RTSP services for the routing of streams through the appropriate sequences of stream processing operators of the RTSP services, and so forth). Various example embodiments for supporting RTSP services within a distributed cloud network may be configured to support provisioning and use of RTSP services in a distributed cloud network in various other ways.

It will be appreciated that these and various other embodiments and advantages or potential advantages of supporting services within a distributed cloud network may be further understood by way of reference to the various figures, which are discussed further below.

FIG. 1 depicts an example embodiment of a distributed cloud system configured to support a set of services.

The distributed cloud system 100 includes a distributed cloud environment 101 having a set of distributed data centers 110-1-110-N (collectively, distributed data centers 110), a communication network 120, a set of client devices 130-1-130-C (collectively, client devices 130), and a service management system 140.

The distributed data centers 110 may be configured to support services. The distributed data centers 110 may be configured to support services by supporting deployment of the services within the distributed cloud environment 101, operation of the services within the distributed cloud environment 101, or the like, as well as various combinations thereof. The distributed data centers 110 may include various types and configurations of resources, which may be used to support service functions of services. The resources of the distributed data centers 110 may include various types and configurations of physical resources, which may be used to support various types and configurations of virtual resources. The distributed data centers 110-1-110-D may communicate with communication network 120 via communication paths 119-1-119-D (collectively, communication paths 119), respectively.

The distributed data centers 110 include respective sets of physical resources 112-1-112-D (collectively, physical resources 112). The physical resources 112 of the distributed data centers 110 may be used to support virtual resources which may be used to support service functions of services. For example, physical resources 112 of a distributed data center 110 may include computing resources, memory resources, storage resources, input-output (I/O) resources, networking resources, or the like. For example, physical resources 112 of a distributed data center 110 may include servers, processor cores, memory devices, storage devices, networking devices (e.g., switches, routers, or the like), communication links, or the like, as well as various combinations thereof. For example, physical resources 112 of a distributed data center 110 may include host servers configured to host virtual resources within the distributed data center 110 (e.g., including server blades organized in racks and connected via respective top-of-rack switches, hypervisors, or the like), aggregating switches and routers configured to support communications of host servers within the distributed data center 110 (e.g., between host servers within the distributed data center 110, between host servers of the distributed data center 110 and devices located outside of the distributed data center 110, or the like), or the like, as well as various combinations thereof. It will be appreciated that the distributed data centers 110 may include various other types of physical resources 112 which may be used to support virtual resources which may be used to support service functions of services.

The physical resources 112 of the distributed data centers 110 may be configured to support respective sets of virtual resources 113-1-113-D (collectively, virtual resources 113). The virtual resources 113 of the distributed data centers 110 may be used to support service functions of services. For example, virtual resources 113 supported using physical resources 112 of a distributed data center 110 may include virtual computing resources, virtual memory resources, virtual storage resources, virtual networking resources (e.g., bandwidth), or the like, as well as various combinations thereof. The virtual resources 113 supported using physical resources 112 of a distributed data center 110 may be provided in the form of virtual machines (VMs), virtual containers (VCs), virtual applications, virtual application instances, virtual file systems, or the like, as well as various combinations thereof. The allocation of virtual resources 113 of distributed data centers 110 may be performed by the service management system 140 based on solutions to the service distribution problem which may be determined by the service management system 140 (e.g., based on determination of the placement of service functions of services, based on determination of the routing of service flows of service functions of services through the service functions of the services, or the like, as well as various combinations thereof). It will be appreciated that the distributed data center 110 may include various other types of virtual resources 113 which may be used to support service functions of services.

The distributed data centers 110 of distributed cloud environment 101 may be arranged in various ways. The distributed data centers 110 may be located at any suitable geographic locations. The distributed data centers 110 (or at least a portion of the distributed data centers 110) may be distributed geographically. The distributed data centers 110 may be distributed across a geographic area of any suitable size (e.g., globally, on a particular continent, within a particular country, within a particular portion of a country, or the like). The distributed data centers 110 or a portion thereof may be located relatively close to the end users. The distributed data centers 110 or a portion thereof may be arranged hierarchically (e.g., with larger distributed data centers 110 having larger amounts of physical resources 112 and virtual resources 113 being arranged closer to the top of the hierarchy (e.g., closer to a core network supporting communications by the larger distributed data centers 110) and smaller distributed data centers 110 having smaller amounts of physical resources 112 and virtual resources 113 being arranged closer to the bottom of the hierarchy (e.g., closer to the end users)). The distributed data centers 110 may be provided at existing locations (e.g., where the cloud provider may be a network service provider, at least a portion of the distributed data centers 110 may be implemented within Central Offices of the network service provider), standalone locations, or the like, as well as various combinations thereof. It will be appreciated that, although primarily presented with respect to an arrangement in which each of the distributed data centers 110 communicates via communication network 120, communication between distributed data centers 110 may be provided in various other ways (e.g., via various communication networks or communication paths which may be available between distributed data centers 110). The distributed data centers 110 of distributed cloud environment 101 may be arranged in various other ways.

The communication network 120 may include any communication network(s) suitable for supporting communications within distributed cloud system 100 (e.g., between distributed data centers 110, between client devices 130 and distributed data centers 110, between the service management system 140 and distributed data centers 110, or the like). For example, communication network 120 may include one or more wireline networks or one or more wireless networks, such as one or more of a Global System for Mobile (GSM) based network, a Code Divisional Multiple Access (CDMA) based network, a Long Term Evolution (LTE) based network, a Fifth Generation (5G) cellular network, a Local Area Network (LAN), a Wireless Local Area Network(s) (WLAN), a Metropolitan Area Network (MAN), a Wide Area Network (WAN), or the like. The communication network 120 includes network resources 121 that may be configured to support communications within distributed cloud system 100, including support for communications associated with access and use of virtual resources 113 of distributed data centers 110 (e.g., between distributed data centers 110, between client devices 130 and distributed data centers 110, or the like) for accessing and using VNFs which may be provided by virtual resources 113. For example, network resources 121 may include network elements (e.g., data routing devices, control functions, or the like), communication links, or the like, as well as various combinations thereof.

The client devices 130 are client devices configured to operate within the distributed cloud environment 101. The client devices 130 may be used to request various services which are deployed within the distributed cloud environment 101, may be used to originate or consume various service which are deployed within the cloud environment, or the like, as well as various combinations thereof. For example, the client devices 130 may be end user devices (e.g., smartphones, tablets, laptop computers, desktop computers, computer terminals, television set-top boxes (STBs), televisions, video displays, virtual reality headsets, cameras, or the like), machine type communication (MTC) end devices (e.g., sensors, actuators, or the like), network devices (e.g., gateways, servers, routers, content delivery network devices, or the like), or the like, as well as various combinations thereof.

The service management system 140 may be configured to support services within the distributed cloud environment 101. The service management system 140 may be configured to support various processes and algorithms configured to solve a cloud service distribution problem for a set of services to be deployed within the distributed cloud environment 101 (e.g., the distributed data centers 110 at which the service functions of services are to be placed, physical resources 112 of the distributed data centers 110 at which the service functions of services are to be placed, or the like, as well as various combinations thereof), the routing of service flows through the service functions of the services deployed within the distributed cloud environment 101, and the associated allocation of cloud resources (e.g., virtual resources 113 of distributed data centers 110) and network resources (e.g., as network resources of distributed data centers 110 and network resources 121 of communication network 120) that satisfy deployment of the services within the distributed cloud environment 101). The service management system 140 may be configured to support various processes and algorithms configured to solve a cloud service distribution problem for a set of services to be deployed within the distributed cloud environment 101 in a manner for reducing or even minimizing the overall cloud network cost in the distributed cloud environment 101. It will be appreciated that various example embodiments for solving a cloud service distribution problem for a set of services to be deployed within distributed cloud environment 101 may be further understood by considering the following description of various example embodiments for supporting distribution of service services, such as RTSP services, within distributed cloud networks.

Various example embodiments are configured to determine, and potentially optimize, the distribution of RTSP services over a cloud network, which may include placement of stream processing operators of the RTSP services and the associated allocation of cloud and network resources and which also may include routing of streams of the RTSP services through the appropriate sequence of operators and the associated cloud and network resources. Many RTSP services, such as telepresence, augmented reality, and real-time computer vision, allow end users to consume personalized media streams that result from the real-time processing of live sources via possibly multiple service functions (or stream processing operators) distributed throughout a cloud network. Various example embodiments presented herein are configured to address or solve various problems associated with determining and potentially optimizing the distribution of RTSP services over a cloud network. Various example embodiments presented herein are configured to provide a cloud network flow-based formulation of various problems associated with determining and potentially optimizing the distribution of RTSP services over a cloud network (e.g., a flow-based formulation that captures arbitrary function and flow chaining, scaling, and replication). Various example embodiments presented herein are configured to provide approximation algorithms (e.g., polynomial-time algorithms with bi-criteria approximation guarantees) for the optimization of distributed computing services with arbitrary function/flow chaining, scaling, and replication.

The confluence of the Internet-of-Things (IoT), expected to interconnect billions of devices with embedded sensing capabilities, and the distributed cloud, envisioned to become a ubiquitous general purpose computing infrastructure able to process information close to sources and end users, is expected to enable a new breed of services and applications that can provide systems automation and optimized operation, as well as human augmented knowledge and cognition, in real time. Unlike traditional information services, in which users typically consume information that is produced or stored at a given source and that is delivered via a communications network, augmented information services provide end users with personalized information that results from the real-time processing of source streams via multiple service functions instantiated over a distributed cloud network. Augmented information services can be consumed by machines (e.g., industrial automation, smart transportation, smart cities, or the like), or humans (e.g., augmented reality, real-time computer vision, telepresence, or the like), and are expected to dominate the next digital transformation era. Typically, in order to provide automation, real-time analytics, or information of real-time relevance, source data typically needs to be streamed, processed, and analyzed as soon as it is being created. In other words, one property of such services, as indicated above and discussed further below, is their RTSP nature.

In general, streams in RTSP services fall into a general class of cloud network flows that exhibit properties of flow chaining, flow scaling, and flow replication. In flow chaining, streams in RTSP services are chained according to their associated service graph, which specifies how streams get processed by corresponding stream processing operators. In flow scaling, streams in RTSP services can change size as they get processed (e.g., streams can either expand (e.g., via video decoding/decompression) or shrink (e.g., via video tracking, detection, or compression functions). In flow replication, the fact that streams in RTSP services can be shared by multiple functions and/or end users at different locations may rely on a capability to replicate streams within the network, which in turn leads to the replication of service functions (namely, flow/function replication is, in essence, a consequence of the multicast nature of streams in RTSP services).

Various example embodiments for supporting deployment of RTSP services may be configured to improve or even optimize the end-to-end distribution of RTSP services over a distributed cloud network. Various example embodiments for supporting deployment of RTSP services may be configured to improve or even optimize the end-to-end distribution of RTSP services over a distributed cloud network while providing a new cloud network flow based formulation for the improved or optimal distribution of RTSP services that captures arbitrary flow chaining, scaling, and replication. Various example embodiments for supporting deployment of RTSP services may be configured to improve or even optimize the end-to-end distribution of RTSP services over a distributed cloud network while providing approximation algorithms for this class of mixed-cast cloud network flow problems that include various flow problems as special cases. Various example embodiments for supporting deployment of RTSP services may be configured to improve or even optimize the end-to-end distribution of RTSP services over a distributed cloud network based on algorithms configured to use randomized rounding techniques based on new approaches to extraction of integer multicast service embeddings from fractional multicast service embeddings. Various example embodiments for supporting deployment of RTSP services may be configured to improve or even optimize the end-to-end distribution of RTSP services over a distributed cloud network where a multicast service embedding is a non-isomorphic embedding, i.e., a service embedding where a given service element of the service (e.g., service function or service stream of the service) can be mapped into multiple cloud network elements (e.g., nodes or paths) in the cloud network due to possible replication of service elements which may be used to satisfy the simultaneous service demands of multiple service endpoints (e.g., multiple service sources and/or multiple service destinations). Various example embodiments for supporting deployment of RTSP services may be configured to improve or even optimize the end-to-end distribution of RTSP services over a distributed cloud network where a multicast service embedding is a non-isomorphic embedding, i.e., a service embedding where a given service function or service stream can be mapped into multiple nodes or paths, respectively, in the cloud network, due to the possible replication of service functions and service streams which may be used to satisfy the simultaneous service demands of multiple sources and/or multiple destinations of the service. Various example embodiments for supporting deployment of RTSP services may be configured to improve or even optimize the end-to-end distribution of RTSP services over a distributed cloud network in manner exhibiting or tending to exhibit bi-criteria approximation guarantees.

Figure 2:
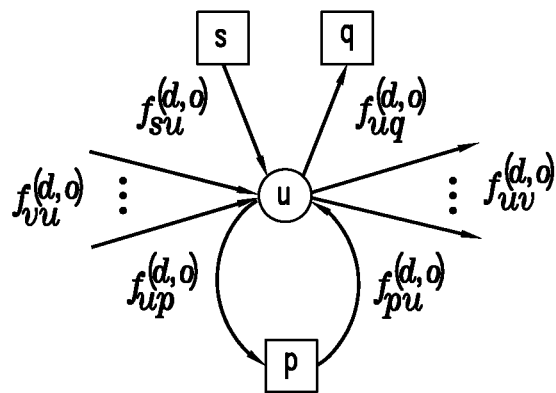
FIG. 2 depicts an example embodiment of a cloud-augmented graph including network edges of a cloud network graph of a cloud network and cloud edges of a cloud network graph of a cloud network.

Various example embodiments for supporting deployment of RTSP services may be based on the following model of a cloud network (although it will be appreciated that this model may be modified in various ways, other models may be used, or the like). The cloud network is modeled as a directed graph $\mathcal{G} = (\mathcal{V}, \mathcal{E})$, where vertices represent distributed computing locations (e.g., core cloud nodes, edge cloud nodes, compute-enabled base stations, end devices with embedded computing resources, or the like), and edges represent network links between computing locations. An example embodiment of a cloud-augmented graph is depicted in FIG. 2, which illustrates a cloud-augmented graph including network edges of a cloud network graph of a cloud network and cloud edges of a cloud network graph of a cloud network. As depicted in FIG. 2, cloud network node $u \in \mathcal{V}$ has compute capacity $c_u$ in processing resource units (e.g., CPUs, containers, virtual machines, or the like), and the cost of allocating one processing resource unit at node $u$ is given by $w_u$. Analogously, link $(u; v)$ has transmission capacity $c_{uv}$ 0 in bits per second, and the cost per bandwidth resource unit is given by $w_{uv}$. Additionally, each node $u \in \mathcal{V}$ is further augmented, where nodes s, q, and p, and the associated edges, are used to model the production, consumption, and processing of data streams, respectively. The resulting cloud-augmented graph is denoted by $\mathcal{G}^a = (\mathcal{V}^a, \mathcal{E}^a)$, where $\mathcal{V}^a = \mathcal{V} \cup \mathcal{V}^{pr}$ and $\mathcal{E}^a = \mathcal{E} \cup \mathcal{E}^{pr}$, with $\mathcal{V}^{pr}$ and $\mathcal{E}^{pr}$ denoting the set of processing, source, and demand nodes, and edges, respectively. In $\mathcal{G}^a$, the cost and capacity of links $(u;p), (p;u), (s;u)$, and $(u;q)$ are $w_{up} = w_u$, $c_{up} = c_u$, $w_{pu} = 0$, $c_{pu} = c_{max}$, $w_{su} = 0$, $c_{su} = c_{max}$, $w_{uq} = 0$, and $c_{uq} = c_{max}$, where $c_{max}$ denotes a high enough value.

Figure 3:
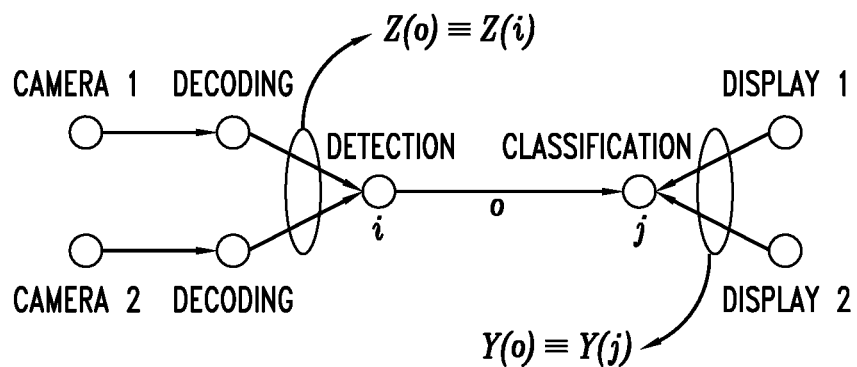
FIG. 3 depicts an example embodiment of a service graph for a video tracking service, in which flows from two video cameras go through decoding, detection, and classification functions before being displayed at two display devices.

Based on the above model, a generic RTSP service $\phi \in \Phi$ can then be described by a directed acyclic graph $\mathcal{G}^\phi = (\mathcal{V}^\phi, \mathcal{E}^\phi)$, where edges represent streams and vertices service functions (stream processing operators). An example embodiment of a service graph is depicted in FIG. 3, which illustrates a service graph for a video tracking service, in which flows from two video cameras go through decoding, detection, and classification functions before being displayed at two display devices. The union of all service graphs in $\Phi$ is denoted as $\mathcal{G}^\Phi = \cup_\phi \mathcal{G}^\phi$. The leaves (vertices with no incoming edges) of the service graph represent the source or production functions (e.g., video capture) and the roots (vertices with no outgoing edges) of the service graph represent the destination or consumption functions (e.g., video display). Source and destination functions are associated with a particular location in the cloud network graph $\mathcal{G}$, while the remaining functions are subject to placement optimization. The set of source and destination functions of service $\phi$ are denoted by $\mathcal{S}^\phi \subset \mathcal{V}^\phi$ and $\mathcal{Q}^\phi \subset \mathcal{V}^\phi$, respectively. Additionally, $S(u) \subset \mathcal{E}^\phi$ is used to denote the total set of streams sourced at node $u \in \mathcal{V}$ and $\mathcal{Q}(u) \subset \mathcal{E}^\Phi$, is used to denote the total set of streams required to be consumed at node $u \in \mathcal{V}$.

For a given stream, represented by edge $o \equiv (i,j) \subset \mathcal{E}^\Phi$, $Z(o) \equiv Z(i)$ is used to denote the set of incoming edges of node $i \subset \mathcal{V}^\Phi$ (i.e., the set of input streams required to generate stream $o \subset \mathcal{E}^\Phi$ via function $i \subset \mathcal{V}^\Phi$) and $Y(o) Y(j)$ is used to denote the set of outgoing edges of node $j \subset \mathcal{V}^\Phi$ (i.e., the set of streams generated by function $j \subset \mathcal{V}^\Phi$). Additionally, $R^o$ denotes the size of stream $o \subset \mathcal{E}^\Phi$, in bits per second (recall that streams in RTSP services can change size as they go through service function processing), and $\eta^o$ denotes the processing resource requirement of stream $o \subset \mathcal{E}^\Phi$ in resource units per flow unit (e.g., CPUs per bit per second). Note that the processing load associated with the generation of stream $o$ is then given by $R^o \eta^o$ (e.g., in CPUs).

The RTSP distribution problem may be formulated as a minimum-cost mixed-cast cloud-network flow problem, characterized by the following two sets of variables: (1) virtual flows) $f_{uv}^{(d,o)}$ indicating the fraction of stream $o \subset \mathcal{E}^\Phi$ used to meet the demand of destination $d \in \mathcal{Q}^\Phi$ that is carried or processed by cloud network edge $(u; v) \in \mathcal{E}^a$ (refer again to FIG. 2), and (2) actual flows $f_{uv}^o$ and $f_{uv}$ indicating the fraction of object $o \subset u^\Phi$ and the total flow, respectively, carried or processed by edge $(u; v) \in u^a$. The resulting integer linear program (ILP) is described as follows:

$$\min \sum_{(u,v) \in \mathcal{E}^a} f_{uv} w_{uv} \quad \text{Eq. (1a)}$$

$$\text{s.t.} \sum_{(v,u) \in \mathcal{E}^a} f_{vu}^{(d,o)} = \sum_{(u,v) \in \mathcal{E}^a} f_{uv}^{(d,o)} \forall u, d, o \quad \text{Eq. (1b)}$$

$$f_{pu}^{(d,o)} = f_{up}^{(d,o')} \forall u, d, o, o' \in Z(o) \quad \text{Eq. (1c)}$$

$$f_{su}^{(d,o)} = 1 \forall u, d, o \in S(u) \quad \text{Eq. (1d)}$$

$$f_{uq}^{(d,o)} = 1 \forall u, d, o \in Q(u) \quad \text{Eq. (1e)}$$

$$f_{uv}^{(d,o)} \leq f_{uv}^o \forall (u, v) d, o \quad \text{Eq. (1f)}$$

$$f_{uv}^o \leq f_{uv}^{o_c} \forall (u, v), d, o_c, o \in C(o_c) \quad \text{Eq. (1g)}$$

$$\sum_{o_c \in O} f_{uv}^{o_c} \lambda_{uv}^{o_c} \leq f_{uv} c_{uv} \forall (u, v) \quad \text{Eq. (1h)}$$

$$f_{uv}^{(d,o)}, f_{uv}^o \in \{0, 1\} \forall u, d, o_c \quad \text{Eq. (1i)}$$

Figure 4:
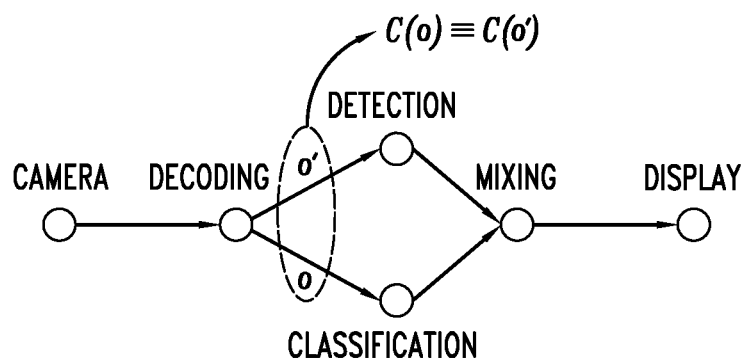
FIG. 4 depicts an example embodiment of a service graph for a service in which the output of a given service function of the service is used as an input to two other service functions of the service.

In Eq. (1), for ease of exposition, when not specified, $u \in \mathcal{V}$, $d \in \mathcal{Q}^\Phi$, $o \subset u^\Phi$, and $(u; v) \in u^a$. As stated in Eq. (1a), the objective is to minimize the total cloud network resource cost, where, recall, that edges in $u^a$ represent both cloud and network resources. This cloud-network flow formulation is based on careful use of virtual and actual flows. Virtual flows are used to meet the demand of every destination for their requested services. As such, virtual flows are expected to satisfy flow conservation and chaining constraints. Eq. (1b) states generalized (processing and transmission) flow conservation constraints, indicating that the total incoming virtual flow is equal to the total outgoing virtual flow at each cloud network node. Eq. (1c) represents flow chaining constraints that impose that, in order to generate commodity (d,o) via the processing element p of node $u$, the input commodities (d,o), $o' \in Z(o)$ must be present at the input of the processing element of node $u$. Eqs. (1d) and (1e) are source and demand constraints that initialize the ingress and egress of the virtual flows associated with the source and destination streams, respectively. Additionally, a connection between virtual and actual flows is established by Eqs. (1f), (1g), and (1h). Recall that a unique aspect of RTSP services that generally cannot be captured via virtual network embedding models is the sharing of streams by multiple functions and/or destinations at different locations. This multicast nature of RTSP streams means that virtual flows with different destinations d, but associated with the same stream o, will overlap when going through the same cloud network edge $(u, v) \in \mathcal{E}^a$. This is assured by Eq. (1f). In addition, for some services, the output of a given service function of the service may be used as an input to two other service functions of the service. An example embodiment of a service graph for such a service is depicted in FIG. 4, which illustrates a service graph in which the output of a given service function of the service is used as an input to two other service functions of the service. In that, case the service graph $G^\Phi$ will include two edges o and o' that represent the same stream. The set $\mathcal{O} \subset \mathcal{E}^\Phi$ is used to denote the set of unique streams in $G^\Phi$, and $\mathcal{C}(o) \subset \mathcal{O}$ is used to denote the unique class associated with stream $o \subset \mathcal{E}$. The Eq. (1g) is used to allow the overlapping of streams belonging to the same class. The total flow at a given cloud network edge is computed by summing over all unique stream flows, sized by the parameter $$\lambda_{uv}^{o_c} \triangleq \begin{cases} R^{o_c} & \text{if } (u, v) \in \mathcal{E} \\ R^{o_c} \eta^{o_c} & \text{if } (u, v) \in \mathcal{E}^{pr} \end{cases} \forall (u, v) \in \mathcal{E}^a, o_c \in O,$$

which determines the resource usage of stream $o_c$ when it is either being generated at a cloud node (e.g., in CPUs) or being transmitted over a network link (e.g., in bits per second). The total flow at edge ($u$, v) is then subject to capacity constraints, as stated by Eq. (1h). Finally, Eq. (1i) imposes the integer nature of stream flow variables. It is noted that, while many batch processing services allow splitting of input data into smaller pieces to be processed in parallel, many stream processing services, on the other hand, have streams that travel and get processed without splitting (e.g., for video analytics or the like), which may make the problem significantly more difficult.

Various example embodiments are configured to support various approximation algorithms configured to support deployment of real-time services.

The RTSP distribution problem, for finding distribution of RTSP services within a cloud network, is made NP-hard by the unsplittable and multicast nature of the RTSP streams of the RTSP services. For example, this is at least partially based on the fact that unsplittable multi-commodity flow is known to be an NP-hard problem, and is further complicated by the multicast nature of the RTSP streams of the RTSP services (which may include flow computation, chaining, and scaling).

Figure 5B:
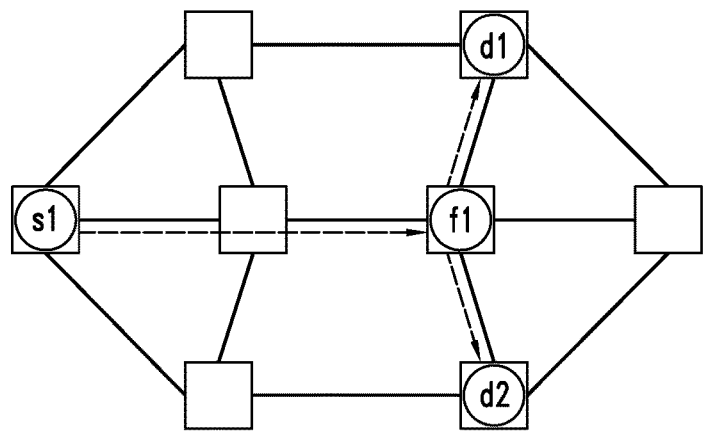
Figure 5C:
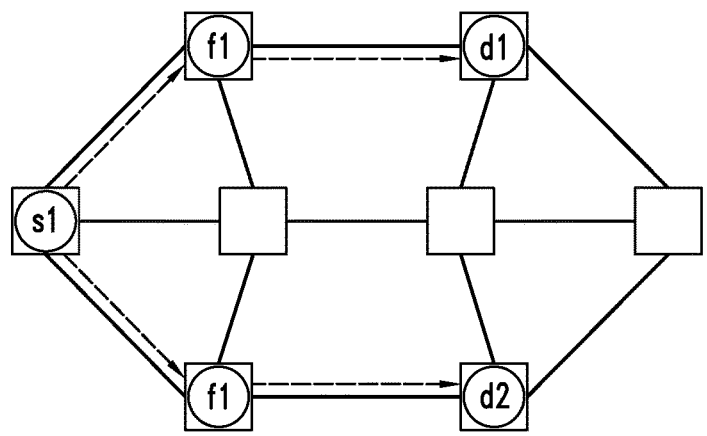
Figure 5D:
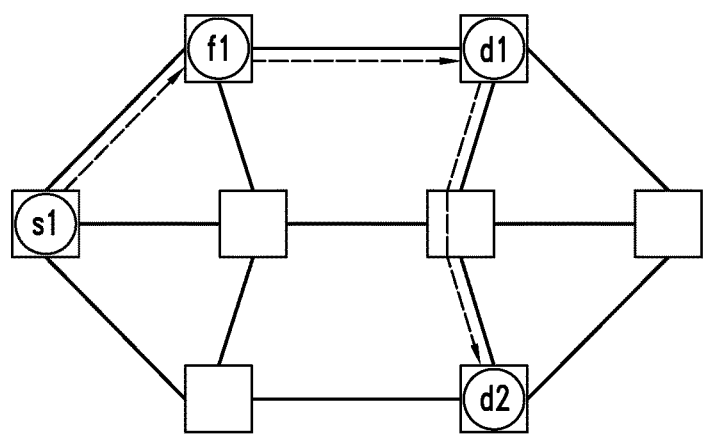

Various example embodiments are configured to support various approximation algorithms for the general class of unsplittable multicast cloud network flow problems that include the RTSP distribution problem. The algorithms are based on randomized rounding of the linear relaxation of the corresponding ILP, including a computation of an LP solution, a decomposition of the LP solution into full integer embeddings of the service graph, and selection of one embedding for each service based on a probability value. It will be appreciated that such a decomposition step may be significantly more challenging in the presence of shared multicast flows. Indeed, the multicast nature of streams and, thus, the possibility of arbitrary flow/function replication in the solution, breaks the isomorphism between the service graph and its instantiation in the physical network. This is illustrated in FIGS. 5A-5D. FIG. 5A depicts a simple service graph of a service and a network graph of a simple eight-node cloud network in which the service is to be deployed. For the service, as indicated by the service graph, a source stream originated by source s goes through service function $f_1$, whose output is consumed by two destinations $d_1$ and $d_2$. FIG. 5B depicts a possible instantiation of the service in the cloud network, where service function $f_1$ gets placed at a single location. FIG. 5C depicts another possible instantiation of the service in the cloud network, where service function $f_1$ gets replicated at two locations. This solution creates two copies of the source stream, including one copy to be used as input to the first copy of service function $f_1$, and another copy to be used as input to the second copy of service function $f_1$. This solution also provides, for each of the copies of service function $f_1$, a respective copy of the same stream, one copy to be consumed by destination $d_1$ and the other copy to be consumed by destination $d_2$. FIG. 5D depicts yet another possible instantiation of the service in the cloud network where the output of service function after being delivered to destination $d_1$, is reused to satisfy the demand of destination $d_2$. It will be appreciated, at least from the simple examples of FIGS. 5A-5D, that it is possible that neither the number of vertices nor the edges are preserved when instantiating RTSP services in a distributed cloud network.

As indicated above and discussed further below, various approximation algorithms for the general class of unsplittable multicast cloud network flow problems that include the RTSP distribution problem may be based on randomized rounding of the linear relaxation of the corresponding ILP to provide an LP solution and decomposition of the LP solution into full integer embeddings of the virtual network. The information from both virtual and actual flows in the LP relaxation of the RTSP service distribution problem (Eq. 1) may be exploited to obtain feasible integer decompositions. The algorithms, referred to herein as unsplittable multicast cloud-network flow (UMCF) algorithms, differ on whether the integer decompositions are done independently for each service (which algorithm is referred to herein as a disjoint-UMCF (d-UMCF) algorithm) or whether the integer decompositions are done jointly across all of the services (which algorithm is referred to herein as a joint-UMCF (j-UMCF) algorithm).

In at least some example embodiments, integer decompositions, for decomposing the LP relaxation of the RTSP service distribution problem (Eq. 1), may be performed independently for the RTSP services using the d-UMCF algorithm. The d-UMCF algorithm is configured as an approximation algorithm for unsplittable multicast cloud-network flow problems that is based on individual decomposition of the LP solution for the RTSP services.

In the d-UMCF Algorithm, (1) the LP relaxation of the ILP is solved to provide an LP solution, (2) the LP solution is decomposed into a convex combination of integer embeddings for each service, and (3) for each of the services, one of the embeddings for the respective service is chosen with a certain probability and the actual flow solution is computed for the selected one of the embeddings for the respective service.

The solving of the LP relaxation of the ILP to provide the LP solution results in an LP solution of the ILP that supports mapping of the set of services $\Phi$ to the cloud network. However, this LP solution is considered to be a fractional solution since it is possible that it may result in factional mappings for one or more of the services $\phi$ in the set of services $\Phi$. Here, it will be appreciated that (1) an integer solution for a given service $\phi$ in the set of services $\Phi$ is one in which the service requirements of the given service $\phi$ in the set of services $\Phi$ can be satisfied with a single mapping of the given service $\phi$ in the set of services $\Phi$ to the cloud network (i.e., only a single service graph is used in the cloud network to support the service requirements of the given service in the set of services $\Phi$ and, thus, to handle the associated traffic of the given service $\phi$ in the set of services $\Phi$) and (2) a fractional solution for a given service $\phi$ in the set of services $\Phi$ is one in which the service requirements of the given service in the set of services Φ can be satisfied based on a combination of multiple fractional mappings of the given service ϕ in the set of services Φ to the cloud network (i.e., multiple service graphs are used in the cloud network to support the service requirements of the given service in the set of services Φ and, thus, to handle the respective fractional portions of the traffic of the given service ϕ in the set of services Φ). The solving of the LP relaxation of the ILP to provide the LP solution results in an LP solution of the ILP that supports mapping of the set of services Φ to the cloud network while supporting the non-isomorphic nature of the services in the set of services Φ and, thus, while permitting multiple instances of service functions of services ϕ in the set of services Φ (e.g., for any given service function of any service ϕ in the set of services Φ, the service function may be replicated into two or more instances across two or more nodes of the cloud network). It will be appreciated that, as discussed further below, decomposition of a fractional solution while permitting multiple instances of service functions of services ϕ in the set of services Φ may be based on use of disjoint or joint algorithms for handling the multiple instances of service functions of services ϕ in the set of services Φ.

The decomposition of the LP solution into a convex combination of integer embeddings for each service ϕ∈Φ may be performed using Algorithm 1, depicted in FIG. 6, where the decomposition of service ϕ is composed of $K_\phi$ embeddings $D_\phi = \{D_1^\phi, \ldots, D_{K_\phi}^\phi\}$, where each embedding $D_k^\Phi = \{M_k^\Phi, p_k^\Phi\}$ is composed of a set of link and node mappings $M_k^\Phi$ and a probability value $p_k^\Phi$, respectively.

The selection of the embeddings for the services ϕ in the set of services Φ may be performed by, for each service ϕ∈Φ, selecting embedding $M_k^\Phi$ from the $K_\phi$ embeddings $D_\phi = \{D_1^\Phi, \ldots, D_{K_\phi}^\Phi\}$ of the respective service ϕ∈Φ with probability $p_k^\Phi$.

The actual flow solution may be computed as follows:

$$f_{uv}^o(D_k^\phi) \triangleq \begin{cases} 1 & \forall (u,v) \in M_k^\phi(o), o \in \mathcal{E}^\phi \\ 0 & o.w. \end{cases}$$

$$f_{uv}^{o_c}(D_k^\phi) = \max_{o \in C(o_c)} f_{uv}^o(D_k^\phi) \; \forall (u,v) \in \mathcal{E}^a, o_c \in O$$

$$f_{uv}(D_k^\phi) = \sum_{o_c \in O} f_{uv}^{o_c}(D_k^\phi) \lambda_{uv}^{o_c}, \; \forall (u,v) \in \mathcal{E}^a$$

The actual flow solution provides the amount of flow of each stream of each service that is processed at each cloud network node and the amount flow of each stream of each service that is transmitted over each cloud network link. As such, the actual flow solution can be used to determine the routing of each stream of each service over the cloud network and the locations where each stream is processed in the cloud network.

As indicated above, the decomposition of the LP solution into a convex combination of integer embeddings for each service ϕ∈Φ may be performed using Algorithm 1, depicted in FIG. 6.

Algorithm 1 is configured to support disjoint decomposition of the LP solution of the service distribution problem into the service embeddings $D_k^\Phi = \{M_k^\Phi, p_k^\Phi\}$ for each of the services ϕ in a set of services Φ. As depicted in FIG. 6, the inputs to Algorithm 1 include the service descriptions of the services ϕ in a set of services Φ and the LP solution to the LP relaxation of the ILP.

Algorithm 1 begins by computing some additional information used to support disjoint decomposition of the LP solution of the service distribution problem into the service embeddings $D_k^\Phi = \{M_k^\Phi, p_k^\Phi\}$ for each of the services in a set of services Φ. Namely, Algorithm 1 computes, for each stream $o \equiv (i,j) \subset \mathcal{E}^\Phi$, the set of destinations that need stream o (denoted as D(o)) and the sets of instances of functions i and j in $\mathcal{G}$ (denoted as $\mathcal{U}(i)$ and $\mathcal{U}(j)$, respectively). The set of destinations that need service stream o may be computed as D(o)={d∈$\mathcal{Q}^\Phi$|exists a path in $\mathcal{G}^\Phi$ connecting j to d}, i.e., for each edge in the service graph representing a given service stream o that connects functions i and j, D(o) is computed as the set of destination functions or sinks in the service graph for which there is a path from j to such destination d. The sets of instances of functions i and j in $\mathcal{G}$ may be computed as $\mathcal{U}(i) = \{u \in V | f_{pu}^{(d,o)} > 0, o \in Y(i)\}$ and $\mathcal{U}(j) = \{u \in V | f_{pu}^{(d,o)} > 0, o \in Y(j)\}$, respectively.

Algorithm 1 is configured to visit each service graph ϕ E Φ and extract a set of embeddings $D_k^\Phi = \{M_k^\Phi, p_k^\Phi\}$. For each service ϕ∈Φ, at each iteration (of the while loop in line 3), Algorithm 1 extracts one integer embedding of service ϕ. Each embedding is constructed by building a mapping $M = (M^V; M^E)$ composed of a node mapping $M^V$ and an edge mapping $M^E$. The node mapping $M^V$ stores the set of nodes in the cloud network associated with each node (e.g., service function) in the service graph, and the edge mapping $M^E$ stores the set of paths in the cloud network associated with each edge (e.g., service stream) in the service graph. In particular, $M^V(i)$ is the set of nodes in the cloud network that host an instance (or copy) of function i, and $M^E(o)$ is the set of paths in the cloud network that transmit an instance (or copy) of stream o. At the beginning of each iteration, Algorithm 1 first initializes the node mapping $M^V$ with the set of nodes in the cloud network hosting the set of source functions S(ϕ) (line 7). Then, Algorithm 1 visits each edge $(i,j) \subset \mathcal{E}^\Phi$, finds a set of paths in cloud network $\mathcal{G}$ according to Procedure 1 (a description of which follows), and updates the node and edge mappings $M^V$ and $M^E$. Procedure 1 of Algorithm 1 allows finding of the non-isomorphic embeddings of RTSP service graphs. That is, an edge (i,j) in service graph ϕ does not necessarily map to a path in $\mathcal{G}$ between a single instance of function i and a single instance of function j, but to a set of paths connecting possibly multiple instances of function i and possible multiple instances of function j. An example may be seen in FIG. 5C, where edge $(s_1, f_1)$ maps to two edges in the network graph. In order to find the set of paths (or, in general, a forest) associated with stream o≡(i,j) in a given embedding, Procedure 1 uses the parameters D(o) (the set of destinations that need stream o) and $\mathcal{U}(i)$ and $\mathcal{U}(j)$ (the set of instances of functions i and j in $\mathcal{G}$).

As indicated above, Procedure 1 of Algorithm 1 is configured to find the set of paths (or, in general, a forest) associated with stream o≡(i,j) in a given embedding in cloud network $\mathcal{G}$ as follows:

While|D(o)|>0

Choose as path P(o), any path in cloud network G that carries non-zero flow of stream $o \equiv (i,j) \subset \mathcal{E}^\Phi$ in the LP solution ($f_{pv}^o > 0$), starts at a node in $M^V(i)$, and ends at a node in U(j). Where the choice of path P(o) can also be done according to the following criterion:

Let P denote the set of paths with non-zero flow of stream $o \equiv (i,j) \subset \mathcal{E}^\Phi$ ($f_{pv}^o > 0$) that start at a node in $M^V(i)$ and end at a node in U(j). Choose a path $P(o) \subset \mathcal{P}$ that covers the maximum number of destinations, i.e., with P(o)=arg $\max_{P \in \mathcal{P}} D(P)$, with $D(P) = |\{d \in \mathcal{Q}^\Phi | f_{uv}^{(d,o)} > 0, (u,v) \in P\}|$.

Set $M^E(o) \leftarrow M^E(o) \cup P(o)$
Set $M^V(j) \leftarrow M^V(j) \cup v$ with v the end of P(o)
$P(o) \leftarrow P \backslash P(o)$
$D(o) \leftarrow D(o) \backslash \{d | f_{uv}^{(d,o)} > 0, (u,v) \in P(o)\}$
End while Algorithm 1, after computing a given embedding $M_k^\Phi$ computes the probability $p_k^\Phi$ for the given embedding $M_k^\Phi$ (which is the probability that the given embedding $M_k^\Phi$ is selected as the embedding $M^\Phi$ for the service $\phi$. The probability $p_k^\Phi$ for the given embedding $M_k^\Phi$ is computed as the minimum value among the flow variables $\{f_{uv}^{(d,o)}\}$ in the given embedding $M_k^\Phi$ (as indicated in lines 14-15 of Algorithm 1 in FIG. 6). Algorithm 1 then subtracts that given embedding $M_k^\Phi$ from the LP solution by first subtracting the minimum value among the flow variables $\{f_{uv}^{(d,o)}\}$ in the given embedding $M_k^\Phi$ from all flow variables $\{f_{uv}^{(d,o)}\}$ in the given embedding $M_k^\Phi$ and then updating the associated stream flow variables $\{f_{uv}^o\}$. It is noted that subtracting the minimum flow value directly on $\{f_{uv}^o\}$ can remove flow of stream o at a given edge (u, v) associated with a destination that was not included in the current embedding, breaking the validity of subsequent embeddings.

The operation of various embodiments of the d-UMCF algorithm may be further understood by considering various aspects related to quantifying the performance of the d-UCMF algorithm.

In order to quantify the performance of the d-UMCF algorithm, it may be helpful to first consider the following lemmas about the decomposition step of the d-UMCF algorithm.

Lemma 1. This lemma says that, given a set of services $\Phi = \{\phi\}$ and a cloud network $\mathcal{G}$, Algorithm 1 decomposes a solution $\{f_{uv}^{(d,o)}, f_{uv}^o\}$ to the LP relaxation of ILP (Eq. 1) into a convex combination of valid mappings for each $\phi$, $D_\Phi = \{D_1^\Phi, \ldots, D_{K_\phi}^\Phi\}$ with $D_k^\Phi = \{M_k^\Phi, p_k^\Phi\}$ such that $\Sigma_k p_k^\Phi = 1, \forall \phi \in \Phi$.

Proof. The proof of Lemma 1 is based on using the construction of Procedure 1 to extend the analysis of valid path mappings to valid forest mappings. Let $\{f_{uv}^o(D_\phi)\}$ denote the flow solution obtained by the d-UMCF algorithm for service $\phi$ (note $f_{uv}^o(D_\phi)$ and $f_{uv}(D_\phi)$ are obtained from $f_{uv}^o(D_\phi)$). Then $f_{uv}^o(D_o)$ is a random variable that takes value $f_{uv}^o(D_k^\Phi)$ with probability $p_k^\Phi$.

Lemma 2. This lemma says that the expected value of the solution obtained by d-UMCF for service $\Phi$, $f_{uv}^o(D_\phi)$, is equal to the solution of the LP relaxation of ILP(1), $\{f_{uv}^o(LP)\}$, i.e., $$E\{f_{uv}^o(D_\phi)\} = \sum_{k=1}^{K\phi} p_k^\phi f_{uv}^o(D_k^\phi) = f_{uv}(LP).$$

Proof. The proof of Lemma 2 follows from Lemma 1 and is based on Theorem 1, which follows.

Theorem 1. In Theorem 1, let $\alpha$ and $\beta$ be defined such that $\alpha = (1+\theta_\alpha \sqrt{0.5 \Delta_\alpha \log(1/\epsilon)})$ and $\beta = (1+\theta_\beta \sqrt{0.5 \Delta_\beta \log(|\epsilon^\alpha/\epsilon|)})$ with $\epsilon \in (0,1)$, where pairs $(\theta_\alpha, \Delta_\alpha)$ and $(\theta_\beta, \Delta_\beta)$ satisfy $$\theta_G^2 \Delta_\alpha \geq \sum_{(u,v) \in \epsilon^\alpha} (w_{uv}/C_{LP})^2 \sum_\phi (L_{uv})^2 \text{ and } \theta_\beta^2 \Delta_\beta \geq \sum_\phi (L_{uv}/f_{uv}^{lp})^2$$

with $L_{uv} = \Sigma_{o_c \in o} \lambda_{uv}^{o_c}, \forall (u,v) \in \epsilon^\alpha$ and $C_{LP}$ being the LP objective value. Then, the d-UMCF algorithm returns, after n rounding tries, with probability $1 - \epsilon^n$, a bi-criteria $(\alpha, \beta)$-approximation for the RTSP distribution problem in (1). That is, the objective value will exceed that of the optimal solution by at most a factor of $\alpha$, while the transmission and processing capacity constraints will be violated by at most a factor of $\beta$.

Proof. The proof of Theorem 1 is based on Lemma 1 and Lemma 2 provided above and is omitted.

It will be appreciated that various embodiments of the d-UMCF algorithm may utilize various other functions and capabilities for decomposing the LP relaxation of the RTSP service distribution problem (Eq. 1) for the RTSP services independently.

In at least some example embodiments, integer decompositions, for decomposing the LP relaxation of the RTSP service distribution problem (Eq. 1), may be performed jointly for the services using the j-UMCF algorithm. The j-UMCF algorithm is configured as an approximation algorithm for unsplittable multicast cloud-network flow problems that is based on joint decomposition of the LP solution for the RTSP services. It will be appreciated that, while the j-UMCF algorithm is similar to the d-UMCF algorithm in some respects, the j-UMCF algorithm is configured to perform the decomposition jointly across the services $\phi$ in the set of services $\Phi$ such that, while decomposing any given service $\phi$ in the set of services $\Phi$, decisions made while decomposing other services in the set of services $\Phi$ may be accounted for (which may provide various benefits given that the services $\phi$ in the set of services $\Phi$ will consume resources from the same shared physical infrastructure.

In the j-UMCF Algorithm, (1) the LP relaxation of the ILP is solved to provide an LP solution, (2) the LP solution is decomposed into a convex combination of integer embeddings for the entire service graph $\Phi$, and (3) one of the embeddings $(M_k^\Phi)$ is chosen with a certain probability $(p_k^\Phi)$ and the actual flow solution is computed.

The solving of the LP relaxation of the ILP to provide the LP solution results in an LP solution of the ILP that supports mapping of the set of services $\Phi$ to the cloud network. However, this LP solution is considered to be a fractional solution since it is possible that it may result in factional mappings for one or more of the services $\phi$ in the set of services $\Phi$. Here, it will be appreciated that (1) an integer solution for a given service $\phi$ in the set of services $\Phi$ is one in which the service requirements of the given service $\phi$ in the set of services $\Phi$ can be satisfied with a single mapping of the given service $\phi$ in the set of services $\Phi$ to the cloud network (i.e., only a single service graph is used in the cloud network to support the service requirements of the given service in the set of services $\Phi$ and, thus, to handle the associated traffic of the given service $\phi$ in the set of services $\Phi$) and (2) a fractional solution for a given service in the set of services $\Phi$ is one in which the service requirements of the given service in the set of services $\Phi$ can be satisfied based on a combination of multiple fractional mappings of the given service in the set of services $\Phi$ to the cloud network (i.e., multiple service graphs are used in the cloud network to support the service requirements of the given service in the set of services $\Phi$ and, thus, to handle the respective fractional portions of the traffic of the given service in the set of services $\Phi$). The solving of the LP relaxation of the ILP to provide the LP solution results in an LP solution of the ILP that supports mapping of the set of services $\Phi$ to the cloud network while supporting the non-isomorphic nature of the services in the set of services $\Phi$ and, thus, while permitting multiple instances of service functions of services in the set of services $\Phi$ (e.g., for any given service function of any service ϕ in the set of services Φ, the service function may be replicated into two or more instances across two or more nodes of the could network). It will be appreciated that, as discussed further below, decomposition of a fractional solution while permitting multiple instances of service functions of services ϕ in the set of services Φ may be based on use of disjoint or joint algorithms for handling the multiple instances of service functions of services ϕ in the set of services Φ.

The decomposition of the LP solution into a convex combination of integer embeddings for the entire service graph Φ may be performed using Algorithm 2, depicted in FIG. 7, where the $k^{th}$ embedding $D_k^\Phi = \{M_k^\Phi, p_k^\Phi\}$ is composed of a set of link and node mappings $M_k^\Phi$ and a probability value $p_k^\Phi$.

The selection of one the k potential embeddings $D_k^\Phi = \{M_k^\Phi, p_k^\Phi\}$ for the service graph Φ may be performed as follows. Namely, for the entire set of services Φ, choose embedding $D_k^\Phi = \{M_k^\Phi, p_k^\Phi\}$ with probability $p_k^\Phi$.

The actual flow solution may be computed as follows:

$$f_{uv}^o(D_k^\Phi) \triangleq \begin{cases} 1 & \forall (u,v) \in M_k^\Phi(o), o \in \mathcal{E}^\Phi \\ 0 & o.w. \end{cases}$$

$$f_{uv}^{o_c}(D_k^\Phi) = \max_{o \in C(o_c)} f_{uv}^o(D_k^\Phi), \quad \forall (u,v) \in M_k^\Phi, o_c \in O$$

$$f_{uv}(D_k^\Phi) = \sum_{o_c \in O} f_{uv}^{o_c}(D_k^\Phi) \lambda_{uv}^{o_c}, \quad \forall (u,v) \in M_k^\Phi$$

The actual flow solution provides the amount of flow of each stream (in a set of services Φ) that is processed at each cloud network node and the amount flow of each stream that is transmitted over each cloud network link. As such, the actual flow solution can be used to determine the routing of each stream over the cloud network and the locations where each stream is processed in the cloud network.

As indicated above, the decomposition of the LP solution into a convex combination of integer embeddings for the entire service graph Φ may be performed using Algorithm 2, depicted in FIG. 7.

Algorithm 2 is configured to support joint decomposition of the LP solution of the service distribution problem into the service embeddings $D_k^\Phi = \{M_k^\Phi, p_k^\Phi\}$ for the set of services Φ. As depicted in FIG. 7, the inputs to Algorithm 2 include the service descriptions of the services ϕ in a set of services Φ and the LP solution to the LP relaxation of the ILP.

Algorithm 2 is configured to consider the entire service graph Φ as a whole, one or more times using one or more evaluations, such that the services ϕ in the set of services Φ are evaluated jointly in determining one or more sets of potential embeddings for the service graph Φ, respectively (i.e., each joint evaluation of the set of services Φ results in a set of potential embeddings for the service graph Φ). In each evaluation of the entire service graph Φ to determine a corresponding set of potential embeddings including the potential embeddings for the services ϕ in the set of services Φ, respectively, the residual capacity is updated after each of the individual service embeddings are determined for the associated services ϕ in the set of services t (see lines 15-17 of Algorithm 2). Procedure 2 of Algorithm 2, like Procedure 1 of Algorithm 1, allows finding the non-isomorphic embeddings of RTSP service graphs. Procedure 2 of Algorithm 2 can work exactly as Procedure 1 of Algorithm 1, but it also has the option to use the residual capacity information (updated in line 17 of Algorithm 2) in order to choose the path P(o). For example, it can choose the path P(o) in $\mathcal{P}$ to that minimizes the maximum residual capacity violation.

It will be appreciated that various embodiments of the j-UMCF algorithm may utilize various other functions and capabilities for decomposing the LP relaxation of the RTSP service distribution problem (Eq. 1) for the RTSP services jointly.

It will be appreciated that, while various embodiments of the d-UMCF algorithm and the j-UMCF algorithm may provide various improvements determination of service deployments for non-isomorphic services such as RTSP services, various embodiments of the j-UMCF algorithm may obtain better solutions than various embodiments of the d-UMCF algorithm (e.g., in terms of deviation from optimal objective value and maximum capacity violations).

It will be appreciated that various example embodiments are configured to support various modifications to the above-described approximation algorithms for supporting deployment of real-time services.

It will be appreciated that, although primarily presented with respect to specific embodiments for supporting deployment of a set of services within a distributed cloud network (e.g., for specific types of services having specific properties, based on specific network models, based on specific service models, or the like, as well as various combinations thereof), various other embodiments for supporting deployment of a set of services within a distributed cloud network (e.g., for other types of services having other sets of properties, for networks based on other types of network models, for other services based on other service models, or the like, as well as various combinations thereof) may be provided.

Figure 8:
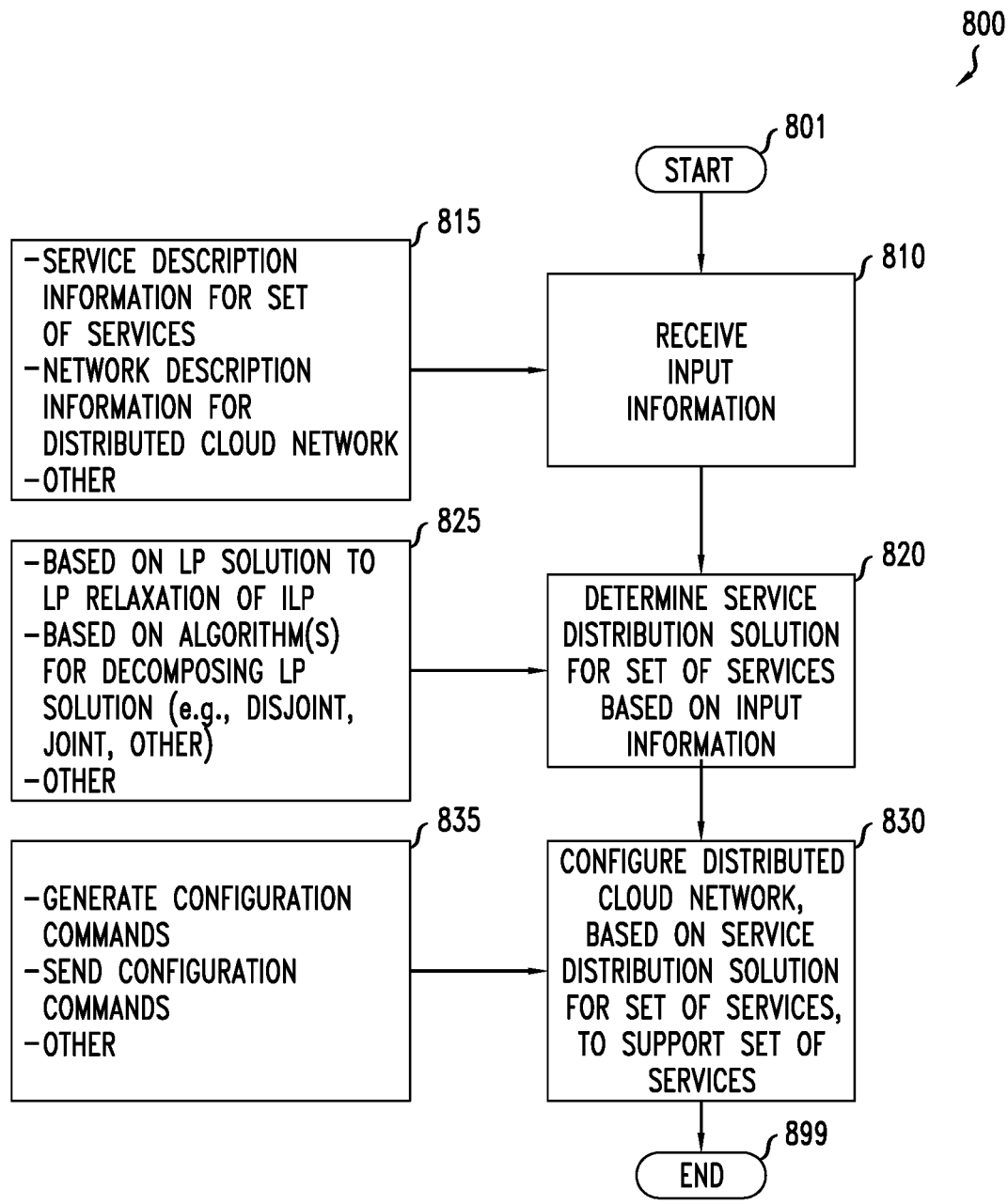
FIG. 8 depicts an example embodiment of a method for deploying a set of services within a distributed cloud network.

FIG. 8 depicts an example embodiment of a method for deploying a set of services within a distributed cloud network. It will be appreciated that, although primarily presented as being performed serially, at least a portion of the functions of method 800 may be performed contemporaneously or in a different order than as presented in FIG. 8.

At block 801, method 800 begins.

At block 810, input information is received. As indicated by box 815, the input information may include service description information for the set of services to be deployed within the distributed cloud network, network description information for the distributed cloud network in which the set of services is to be deployed, or the like, as well as various combinations thereof.

The service description information for the set of services may include, for each of the services, a respective set of service requirements to be supported for the respective service (e.g., service elements to be supported for the service (e.g., service functions to be supported, service streams to be supported, or the like), an amount of processing capability to be supported, an amount of bandwidth to be supported, or the like), a respective indication of service elements of the respective service (e.g., one or more source elements, one or more service functions, one or more destination elements, one or more service edges configured to connect service elements in various ways, or the like, as well as various combinations thereof), service requirements for one or more of the service elements of the service (e.g., service requirements for respective service functions of the service, service requirements for respective service streams of the service, or the like), a respective service graph description indicative of a respective service graph for the respective service (e.g., including service nodes representing the service functions and service edges representing the service streams), or the like, as well as various combinations thereof.

The network description information for the distributed cloud network in which the set of services is to be deployed may include an indication of the network elements of the distributed cloud network (e.g., locations, network nodes, network links, or the like, as well as various combinations thereof), a network graph description indicative of a network graph for the distributed cloud network (e.g., indicative of interconnections of network nodes of the distributed cloud network by network links of the distributed cloud network), network resource information indicative of resources available within the distributed cloud network (e.g., amounts of processing resources available at network nodes, amounts of bandwidth resources available on network links, or the like, as well as various combinations thereof), or the like, as well as various combinations thereof.

It will be appreciated that various other types of input information may be utilized for determining a deployment of a set of services within a distributed cloud network.

At block 820, a service distribution solution for the set of services is determined based on the input information.

The service distribution solution for the set of services may be determined based on the input information in various ways. As indicated by box 825, the service distribution solution for the set of services may be determined based on the input information based on use of various problem specifications, problem solution techniques, algorithms, or the like, as well as various combinations thereof. For example, the service distribution solution for the set of services may be determined based on an LP solution of an LP relaxation of an ILP. For example, the service distribution solution for the set of services may be determined based on decomposition of an LP solution of an LP relaxation of an ILP into a combination of integer embeddings in order to select a set of embeddings of the set of services in the distributed cloud network. For example, the decomposition of an LP solution of an LP relaxation of an ILP into a combination of integer embeddings in order to select a set of embeddings of the set of services in the distributed cloud network may be performed using various algorithms, such as a disjoint algorithm configured to determine embeddings for services independently, a joint algorithm configured to determine embeddings for services jointly, or the like. It will be appreciated that the service distribution solution for the set of services may be determined based on the input information in various other ways. It will be appreciated that determination of the service distribution solution for the set of services based on the input information may be further understood by way of reference to FIGS. 2-7.

The service distribution solution for the set of services may be specified, for use in deploying the set of services in the distributed cloud network, in various ways. The service distribution solution may include an indication of a placement of the service functions of the services within the distributed cloud network (e.g., for each of the service functions of each of the services, of one or more of the network nodes at which the respective service function is to be placed, resources at each of the one or more network nodes which are to be allocated to support the respective service function, transport resource units allocated at the respective network links to support the respective service function, or the like, as well as various combinations thereof), an indication of routing of service flows of the services in the set of services through the service functions of the services in the set of services (e.g., an indication of an amount of flow of each commodity processed at each of the network nodes and routed through each of the network links), or the like, as well as various combinations thereof.

It will be appreciated that various other types of information may be used to specify the service distribution solution for the set of services for use in supporting deployment of the set of services in the distributed cloud network.

At block 830, the set of services is deployed within the distributed cloud network based on configuration of the distributed cloud network based on the service distribution solution for the set of services. As indicated by box 835, the set of services may be deployed within the distributed cloud network, based on configuration of the distributed cloud network based on the service distribution solution for the set of services, by generating configuration commands based on the service distribution solution and sending the configuration commands to the distributed cloud network to configure the distributed cloud network to support the set of services. The configuration commands may be generated for and sent to network nodes of the distributed cloud network to configure the network nodes and associated network links to allocate resources to support the set of services based on the service distribution solution for the set of services.

At block 899, method 800 ends.

Figure 9:
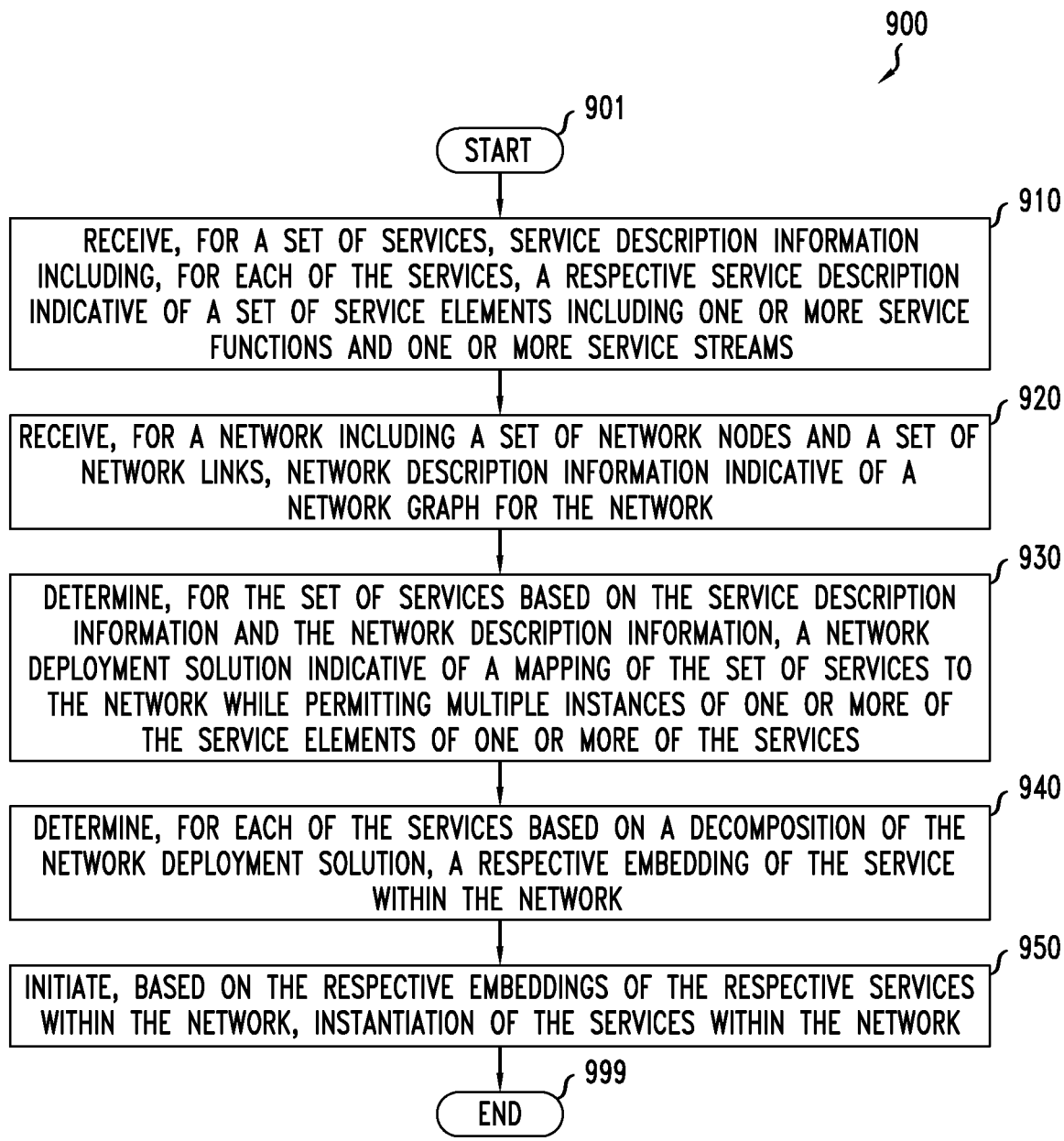
FIG. 9 depicts an example embodiment of a method for supporting deployment of a set of services within a distributed cloud network.

FIG. 9 depicts an example embodiment of a method for supporting deployment of a set of services within a distributed cloud network. It will be appreciated that various portions of method 900 of FIG. 9 may be considered to be associated with various portions of method 800 of FIG. 8 and, thus, that various elements of method 900 may be incorporated into method 800 of FIG. 8 and various elements of method 800 of FIG. 8 may be incorporated into method 900 of FIG. 9. It will be appreciated that, although primarily presented as being performed serially, at least a portion of the functions of method 900 of FIG. 9 may be performed contemporaneously or in a different order than as presented in FIG. 9. At block 901, method 900 begins. At block 910, receive, for a set of services, service description information including, for each of the services, a respective service description indicative of a set of service elements of the respective service including one or more service functions and one or more service streams. At block 920, receive, for a network including a set of network nodes and a set of network links, network description information indicative of a network graph for the network. At block 930, determine, for the set of services based on the service description information and the network description information, a network deployment solution indicative of a mapping of the set of services to the network while permitting multiple instances of one or more of the service elements of one or more of the services. At block 940, determine, for each of the services based on a decomposition of the network deployment solution, a respective embedding of the service within the network. At block 950, initiate, based on the respective embeddings of the respective services within the network, instantiation of the services within the network. At block 999, method 900 ends.

Various example embodiments for supporting services within a distributed cloud network may provide various advantages or potential advantages. For example, various example embodiments for supporting services within a distributed cloud network are configured to support capabilities for solving a cloud service distribution problem for a set of services to be deployed within a distributed cloud network in order to determine the placement of service functions of the services within the cloud network, the routing of service flows of the services through the appropriate service functions of the services within the cloud network, and the associated allocation of cloud and network resources that support the deployment and routing of the services within the cloud network. For example, various example embodiments for supporting services within a distributed cloud network are configured to support capabilities for solving a cloud service distribution problem for a set of services to be deployed within a distributed cloud network in a manner for reducing or even minimizing the overall cloud network cost in the distributed cloud network. For example, various example embodiments for supporting services within a distributed cloud network may provide various advantages over use of virtual network embedding for supporting deployment of real-time services in cloud networks (e.g., where virtual network embedding is not expected to be able to capture or account for certain features of real-time services such as RTSP services (e.g., flow/function replication) and is not expected to support arbitrary functions or flow chaining, scaling, or replication). Various example embodiments for supporting services within a distributed cloud network may provide various other advantages or potential advantages.

Figure 10:
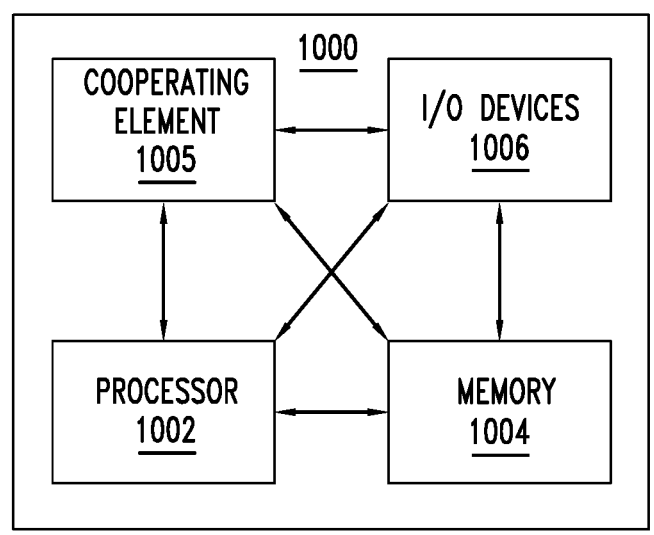
FIG. 10 depicts an example embodiment of a computer suitable for use in performing various functions presented herein.

FIG. 10 depicts an example embodiment of a computer suitable for use in performing various functions described herein.

The computer 1000 includes a processor 1002 (e.g., a central processing unit, a processor having a set of processor cores, a processor core of a processor, or the like) and a memory 1004 (e.g., a random access memory, a read only memory, or the like). The processor 1002 and the memory 1004 may be communicatively connected. In at least some embodiments, the computer 1000 may include at least one processor and at least one memory including computer program code, wherein the at least one memory and the computer program code are configured to, with the at least one processor, cause the computer to perform various functions presented herein.

The computer 1000 also may include a cooperating element 1005. The cooperating element 1005 may be a hardware device. The cooperating element 1005 may be a process that can be loaded into the memory 1004 and executed by the processor 1002 to implement functions as discussed herein (in which case, for example, the cooperating element 1005 (including associated data structures) can be stored on a non-transitory computer-readable storage medium, such as a storage device or other storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1000 may represent a general architecture and functionality suitable for implementing functional elements described herein, portions of functional elements described herein, or the like, as well as various combinations thereof. For example, computer 1000 may provide a general architecture and functionality that is suitable for implementing one or more elements presented herein, such as a distributed data center 110 or a portion thereof, physical resources 112 configured to provide virtual resources 113, an element of communication network 120 or a portion thereof, a client device 130 or a portion thereof, a service management system 140 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including program code;
   wherein the at least one memory and the program code are configured to, with the at least one processor, cause the apparatus to at least:
      receive, for a set of services, service description information including, for each of the services, a respective service description indicative of a set of service elements including one or more service functions and one or more service streams;
      receive, for a network including a set of network nodes and a set of network links, network description information indicative of a network graph for the network;
      determine, for the set of services based on the service description information and the network description information, a network deployment solution indicative of a mapping of the set of services to the network while permitting multiple instances of one or more of the service elements of one or more of the services;
      determine, for each of the services based on a decomposition of the network deployment solution, a respective embedding of the service within the network; and
      initiate, based on the respective embeddings of the respective services within the network, instantiation of the services within the network.

2. The apparatus of claim 1, wherein the network deployment solution is a linear programming (LP) relaxation of an integer linear problem (ILP) defined based on the service description information and the network description information.

3. The apparatus of claim 1, wherein, for a given service element of a given one of the services, the network deployment solution includes multiple instances of the given service element.

4. The apparatus of claim 3, wherein the multiple instances of the given service element are associated with multiple service endpoints of the given one of the services.

5. The apparatus of claim 4, wherein the multiple service endpoints of the given one of the services include multiple service sources of the given one of the services or multiple service destinations of the given one of the services.

6. The apparatus of claim 3, wherein the multiple instances of the given service element are associated with multiple copies of a service stream of the given one of the services that are associated with multiple network paths of the network.

7. The apparatus of claim 1, wherein the network deployment solution includes, for at least one of the services, a respective set of potential embeddings of the respective service within the network.

8. The apparatus of claim 7, wherein, for at least one of the services, the respective set of potential embeddings includes a set of multiple fractional potential embeddings for one of the service elements of the respective service.

9. The apparatus of claim 7, wherein, for at least one of the services, the network deployment solution includes multiple instances of a given service element of the respective service and the respective set of potential embeddings includes a set of multiple fractional potential embeddings for one of the multiple instances of the given service element.

10. The apparatus of claim 1, wherein the respective embeddings of the services within the network are determined based on respective sets of potential embeddings of the respective services within the network.

11. The apparatus of claim 10, wherein, for at least one of the services, the respective set of potential embeddings of the respective service within the network is determined based on mapping of the respective one or more service streams of the respective service to a respective set of paths of the network graph.

12. The apparatus of claim 11, wherein the set of paths of the network graph includes multiple paths associated with multiple instances of one of the service streams of the respective service.

13. The apparatus of claim 1, wherein the decomposition of the network deployment solution is a disjoint decomposition of the network deployment solution for the respective services individually.

14. The apparatus of claim 1, wherein, to determine the respective embeddings of the services within the network, the at least one memory and the program code are configured to, with the at least one processor, cause the apparatus to at least:
identify, for each of the services based on the decomposition of the network deployment solution, a respective set of potential embeddings of the respective service within the network; and
select, for each of the services from the respective set of potential embeddings of the respective service within the network, the respective embedding of the respective service within the network.

15. The apparatus of claim 14, wherein the at least one memory and the program code are configured to, with the at least one processor, cause the apparatus to at least:
determine, for each of the potential embeddings based on an amount of service traffic of the respective service determined to be associated with the respective potential embedding, a respective probability that the respective potential embedding is selected for the respective service.

16. The apparatus of claim 1, wherein, to determine the respective embeddings of the services within the network, the at least one memory and the program code are configured to, with the at least one processor, cause the apparatus to at least:
determine, for one of the service streams of one of the services, a set of paths of the network graph.

17. The apparatus of claim 16, wherein, to determine the set of paths of the network graph for the one of the service streams of the one of the services, the at least one memory and the program code are configured to, with the at least one processor, cause the apparatus to at least:
select, from the network graph, a selected path satisfying a maximum number of service destinations of the one of the services.

18. The apparatus of claim 1, wherein the decomposition of the network deployment solution is a joint decomposition of the network deployment solution for the services as a group.

19. The apparatus of claim 1, wherein, to determine the respective embeddings of the services within the network, the at least one memory and the program code are configured to, with the at least one processor, cause the apparatus to at least:
determine, for the set of services based on the decomposition of the network deployment solution, a plurality of sets of potential embeddings of the respective services within the network; and
select, from the plurality of sets of potential embeddings of the respective services within the network, one of the plurality of sets of potential embeddings to provide thereby the respective embeddings of the respective services within the network.

20. The apparatus of claim 19, wherein the at least one memory and the program code are configured to, with the at least one processor, cause the apparatus to at least:
determine, for each of the sets of potential embeddings based on an amount of service traffic of the services determined to be associated with the respective set of potential embeddings, a respective probability that the respective set of potential embeddings is selected for the set of services.

21. A non-transitory computer-readable medium storing instructions configured to cause an apparatus to at least:
receive, for a set of services, service description information including, for each of the services, a respective service description indicative of a set of service elements including one or more service functions and one or more service streams;
receive, for a network including a set of network nodes and a set of network links, network description information indicative of a network graph for the network;
determine, for the set of services based on the service description information and the network description information, a network deployment solution indicative of a mapping of the set of services to the network while permitting multiple instances of one or more of the service elements of one or more of the services;
determine, for each of the services based on a decomposition of the network deployment solution, a respective embedding of the service within the network; and
initiate, based on the respective embeddings of the respective services within the network, instantiation of the services within the network.

22. A method, comprising:
- receiving, for a set of services, service description information including, for each of the services, a respective service description indicative of a set of service elements including one or more service functions and one or more service streams;
- receiving, for a network including a set of network nodes and a set of network links, network description information indicative of a network graph for the network;
- determining, for the set of services based on the service description information and the network description information, a network deployment solution indicative of a mapping of the set of services to the network while permitting multiple instances of one or more of the service elements of one or more of the services;
- determining, for each of the services based on a decomposition of the network deployment solution, a respective embedding of the service within the network; and
- initiating, based on the respective embeddings of the respective services within the network, instantiation of the services within the network.

* * * * *